(12) United States Patent
Unagami et al.

(10) Patent No.: US 10,956,555 B2
(45) Date of Patent: Mar. 23, 2021

(54) MANAGEMENT SYSTEM, VEHICLE, AND INFORMATION PROCESSING METHOD

(71) Applicant: Panasonic Intellectual Property Corporation of America, Torrance, CA (US)

(72) Inventors: Yuji Unagami, Osaka (JP); Motoji Ohmori, Osaka (JP); Hideki Matsushima, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 167 days.

(21) Appl. No.: 16/040,648

(22) Filed: Jul. 20, 2018

(65) Prior Publication Data

US 2019/0042726 A1 Feb. 7, 2019

Related U.S. Application Data

(60) Provisional application No. 62/539,696, filed on Aug. 1, 2017.

(30) Foreign Application Priority Data

Apr. 12, 2018 (JP) .............................. JP2018-076714

(51) Int. Cl.
*H04L 29/06* (2006.01)
*G06F 21/44* (2013.01)
(Continued)

(52) U.S. Cl.
CPC ............. *G06F 21/44* (2013.01); *G05B 15/02* (2013.01); *G07C 5/008* (2013.01); *H04L 63/08* (2013.01); *H04L 9/0637* (2013.01)

(58) Field of Classification Search
CPC ......... G06F 21/44; G05B 15/02; G07C 5/008; H04L 2012/40215; H04L 63/08; H04L 9/0637; H04W 4/48
See application file for complete search history.

(56) References Cited

U.S. PATENT DOCUMENTS

2005/0192716 A1* 9/2005 Ito ........................... B60R 25/00
701/1
2015/0019068 A1* 1/2015 Peirce ................... H04L 67/125
701/31.5

(Continued)

FOREIGN PATENT DOCUMENTS

JP 2002-140447 5/2002

OTHER PUBLICATIONS

The Extended European Search Report dated Jan. 4, 2019 for European Patent Application No. 18184728.6.

(Continued)

*Primary Examiner* — Yogesh Paliwal
(74) *Attorney, Agent, or Firm* — Greenblum & Bernstein, P.L.C.

(57) ABSTRACT

Provided is a management system including vehicles and authentication servers. A vehicle includes a communication circuit, multiple electronic control units connected to an in-vehicle network, a detection circuit, and a transaction data generating circuit. The detection circuit detects a replacement of one or more electronic control units. The transaction data generating circuit generates transaction data including an identifier that uniquely identifies each of the replaced electronic control units. An authentication server includes a communication circuit, and a verifying circuit that verifies validity of the transaction data obtained by the vehicle. The authentication server also includes a recording circuit that, upon verifying that the first transaction data is valid by the (Continued)

verifying unit, records the transaction data in a recording device.

11 Claims, 21 Drawing Sheets

(51) Int. Cl.
*G07C 5/00* (2006.01)
*G05B 15/02* (2006.01)
*H04L 9/06* (2006.01)

(56) References Cited

U.S. PATENT DOCUMENTS

| 2017/0026373 | A1  | 1/2017 | Yajima et al. |
| 2017/0111177 | A1* | 4/2017 | Oguma ................. H04L 67/12 |
| 2018/0018723 | A1* | 1/2018 | Nagla ................. G06Q 20/4014 |

OTHER PUBLICATIONS

Weimerskirch A et al: "Cryptographic Component Identification: Enabler for Secure Vehicles", Vehicular Technology Conference, 2005. VTC-2005-FALL. 2005 IEEE 62nd Dallas, TX, USA Sep. 25-28, 2005, Piscataway, NJ, USA, IEEE, vol. 2, Sep. 25, 2005 (Sep. 25, 2005), pp. 1227-1231, XP010878751.

* cited by examiner

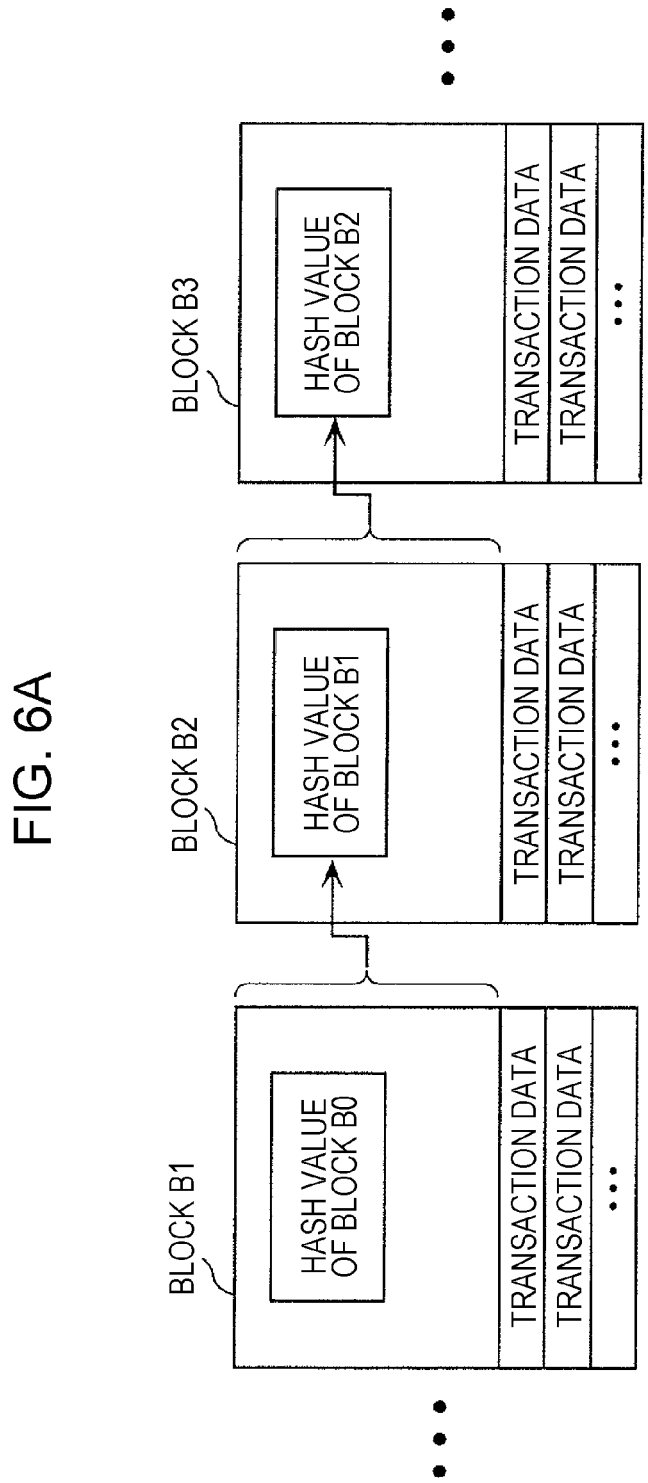

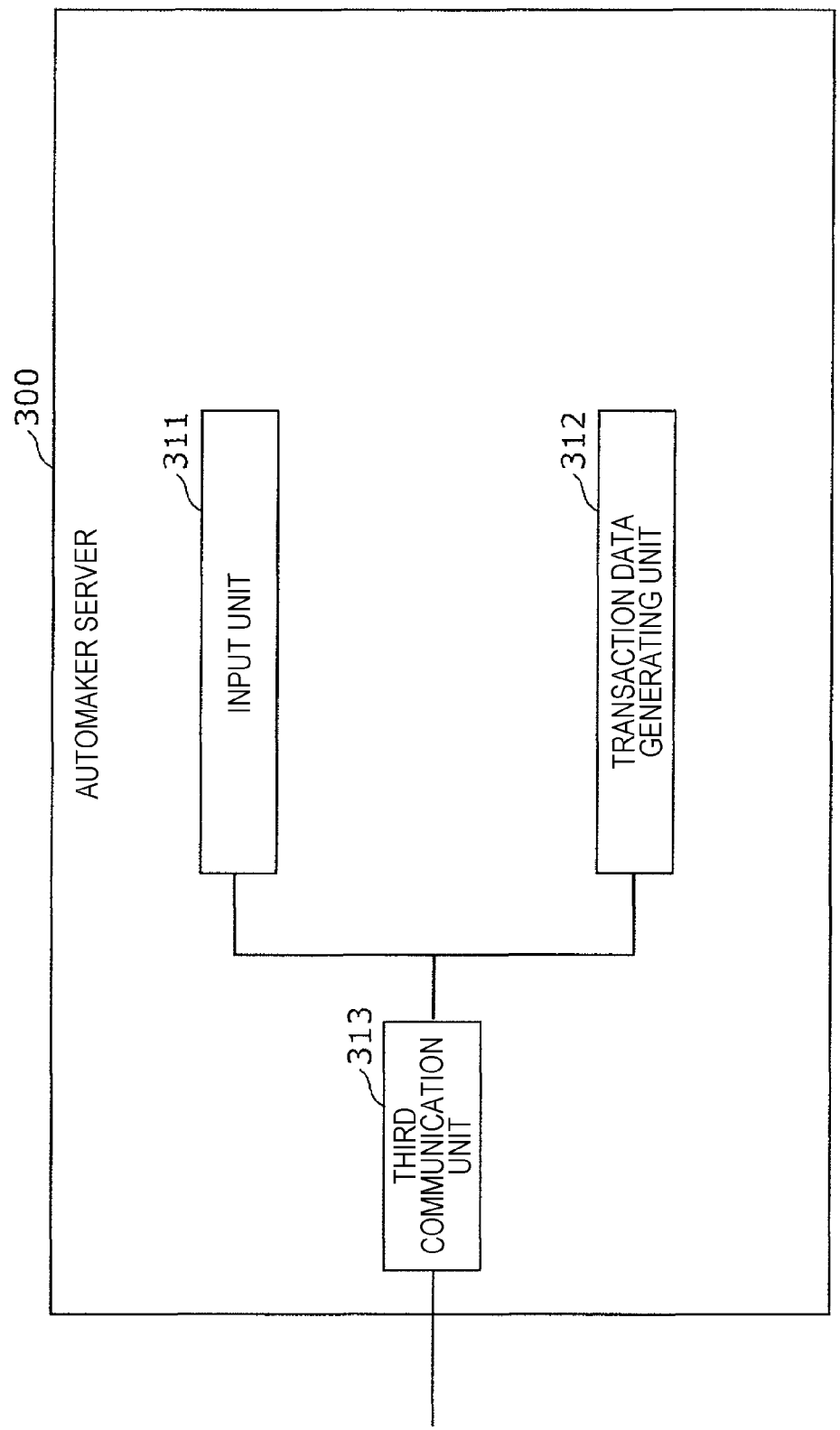

FIG. 11

AN AUTOMOBILE PART HAS BEEN REPLACED.
THIS IS NOT AN AUTOMAKER GENUINE PART.
CONTINUE USE?

YES  NO

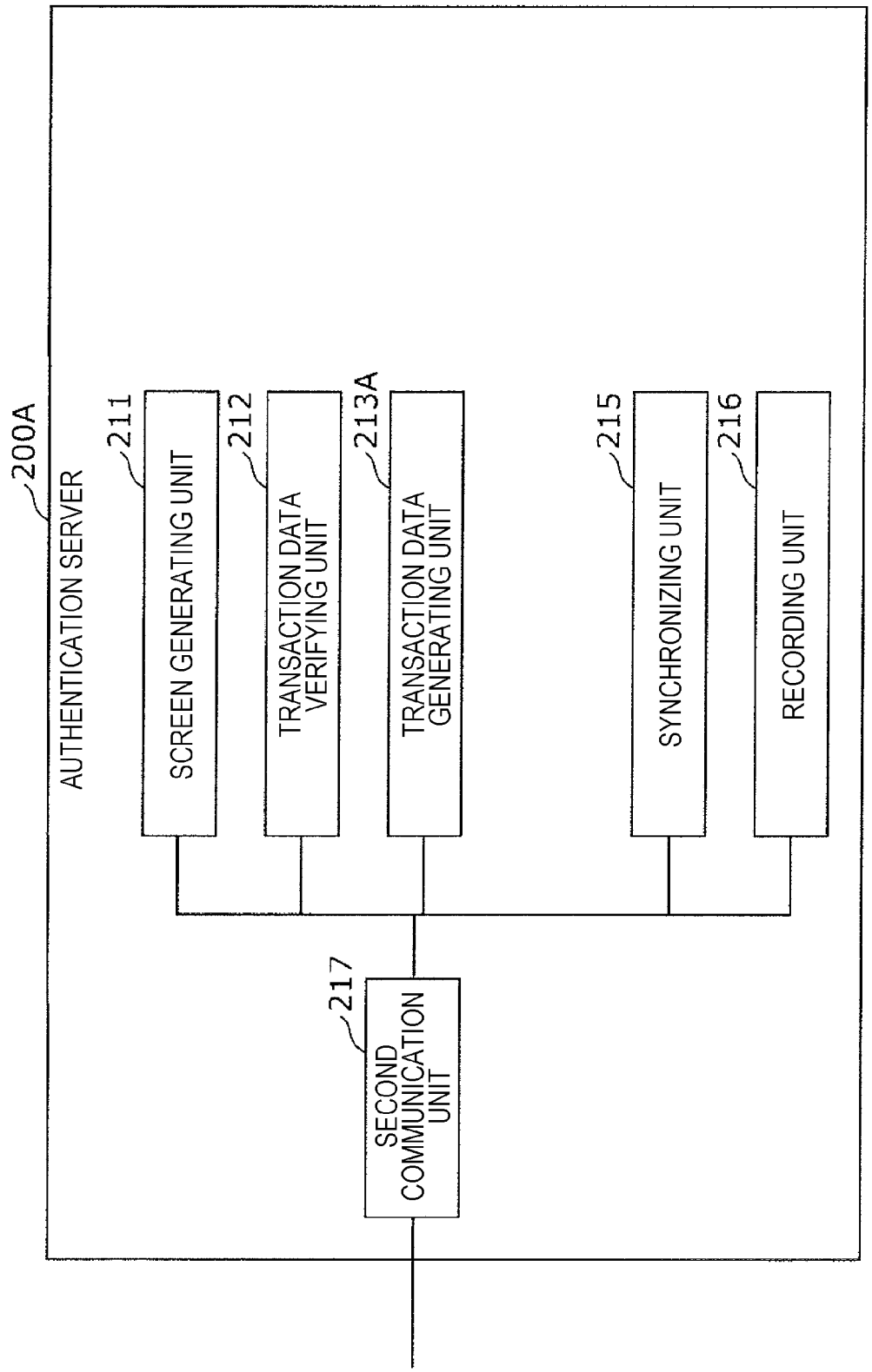

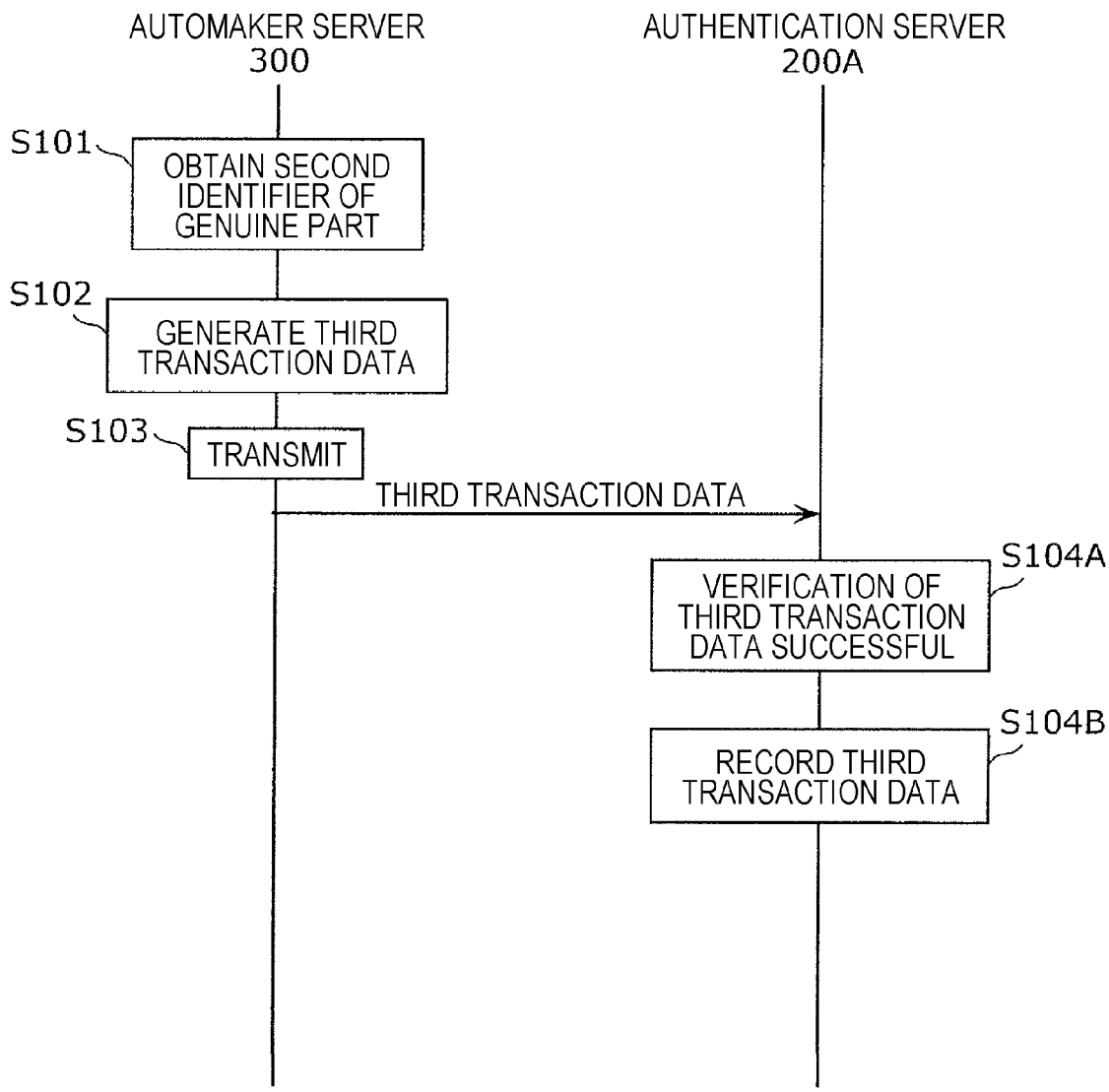

FIG. 16

| FIRST IDENTIFIER | TRANSACTION | GENUINE/ NON-GENUINE | CONFIRMED BY USER? |
|---|---|---|---|
| 131 | PART REPLACEMENT | GENUINE PART | — |
| 131 | PART REPLACEMENT | NON-GENUINE PART | YES |
| ... | ... | ... | ... |

MANAGEMENT SYSTEM, VEHICLE, AND INFORMATION PROCESSING METHOD

BACKGROUND

1. Technical Field

The present disclosure relates to a management system, a vehicle, and an information processing method.

2. Description of the Related Art

In recent years, a great number of devices called electronic control units (ECUs) have been placed in systems in automobiles. A network connecting these ECUs is referred to as an onboard network. Many standards exist for onboard networks. One of the most mainstream of these onboard networks is a standard called Controller Area Network (hereinafter referred to as "CAN"). In the CAN standard, messages are transmitted by broadcasting, so ECUs connected to a CAN are capable of obtaining all messages.

ECUs connected to a CAN are connected to or integral with automobile parts, so when an automobile part is replaced, the ECU that is connected to or integral with that part is also replaced. Replacing parts at appropriate timings enables automobiles to travel safely. For example, Japanese Unexamined Patent Application Publication No. 2002-140447 discloses a system where appropriate replacement timings of automobile parts can be easily comprehended.

SUMMARY

However, if a non-genuine part, that is not a genuine part certified by the automaker, is used for the replacement automobile part, safe travel of the automobile may be at risk. Accordingly, there is demand for an arrangement where the nature of the replacement part can be found in a sure manner.

One non-limiting and exemplary embodiment provides a management system and so forth that can manage replacement parts in a vehicle in a sure manner.

In one general aspect, the techniques disclosed here feature a management system including one or more vehicles, and one or more authentication servers. Each of the one or more vehicles includes a first communication circuit that performs communication with at least one authentication server of the one or more authentication servers, a plurality of electronic control units (ECUs) connected to a network inside a vehicle, a detection circuit that, when one or more electronic control units of the plurality of electronic control units have been replaced, detects the replaced one or more electronic control units among the plurality of electronic control units, and a transaction data generating circuit that generates first transaction data including a first identifier that uniquely identifies each of the replaced one or more electronic control units which the detection circuit has detected, and transmits the generated first transaction data to the at least one authentication server via the first communication circuit. Each of at least one authentication server includes a second communication circuit that performs communication with each of the one or more vehicles, a verifying circuit that verifies validity of the first transaction data obtained by at least one vehicle of the one or more vehicles, and a recording circuit that, upon verifying that the first transaction data is valid by the verifying circuit, records the first transaction data in a recording device.

According to the present disclosure, replacement parts in a vehicle can be managed in a sure manner.

It should be noted that general or specific embodiments may be implemented as a system, a method, an integrated circuit, a computer program, or a computer-readable recording medium such as a CD-ROM or the like, or any selective combination of system, method, integrated circuit, computer program, and recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6A is an explanatory diagram illustrating a data structure of a block chain;

FIG. 7 is a block diagram illustrating the function configuration of an automaker server according to the first embodiment;

FIG. 11 is a diagram illustrating an example of a screen display displayed in the vehicle in the first embodiment;

FIG. 12 is a block diagram illustrating the functional configuration of an authentication server according to a modification of the first embodiment;

FIG. 13 is a sequence diagram illustrating registration processing between the automaker server and authentication server in the modification of the first embodiment;

FIG. 14 illustrates an example of a data structure used when the authentication server records third transaction data in the modification of the first embodiment;

FIG. 16 illustrates an example of a data structure used when the authentication server records first transaction data in the modification of the first embodiment;

DETAILED DESCRIPTION

Figure 1:
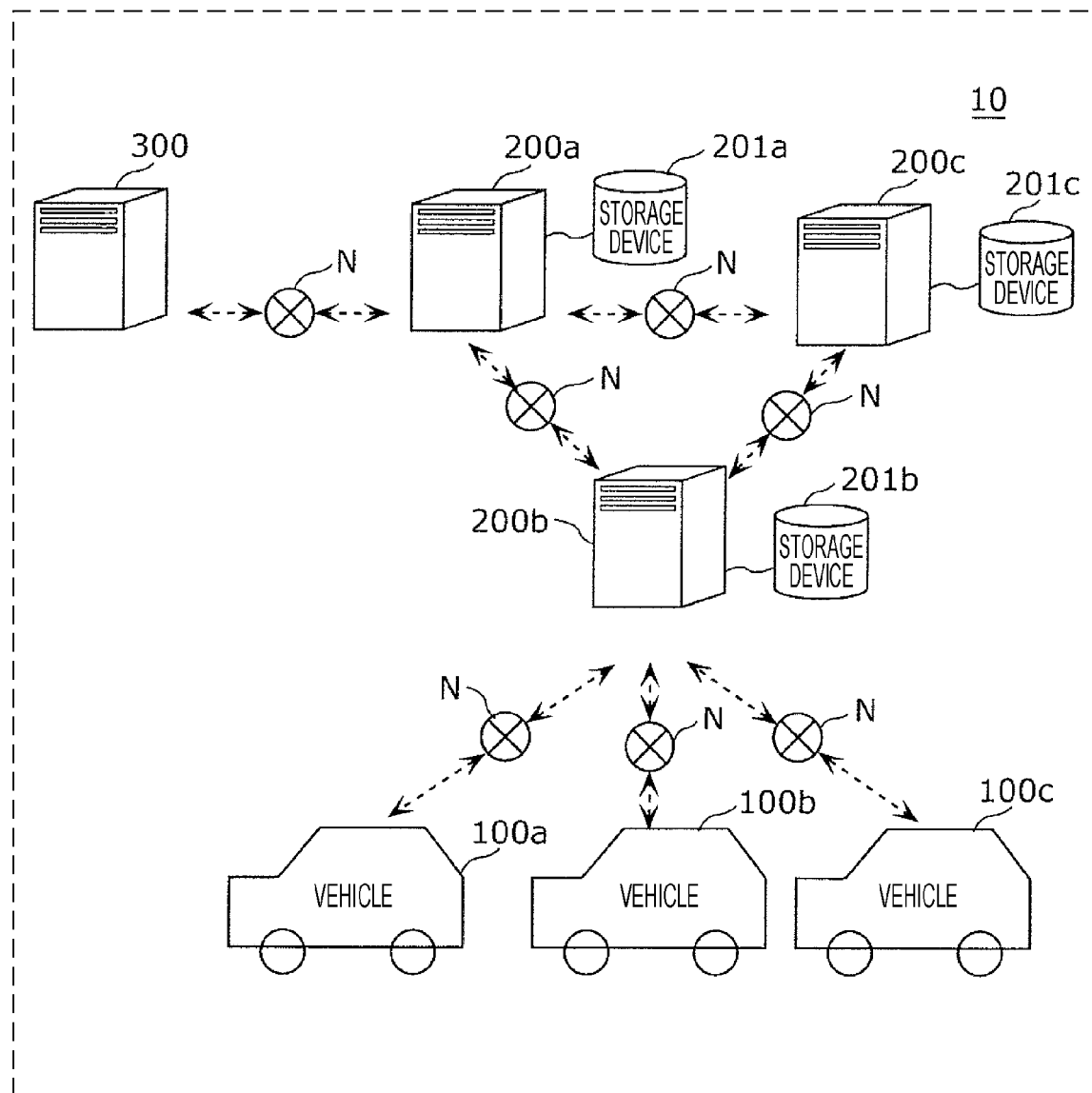
FIG. 1 is a diagram illustrating an example of the configuration of a management system according to a first embodiment.

A management system according to an aspect of the present disclosure is a management system that includes one or more vehicles, and one or more authentication servers. Each of the one or more vehicles includes a first communication circuit that performs communication with at least one authentication server of the one or more authentication servers, a plurality of electronic control units (ECUs) connected to a network inside the vehicle, a detection circuit that, when one or more electronic control units of the plurality of electronic control units have been replaced, detects the replaced one or more electronic control units among the plurality of electronic control units, and a transaction data generating circuit that generates first transaction data including a first identifier that uniquely identifies each of the replaced one or more electronic control units which the detection circuit has detected, and transmits the generated first transaction data to the at least one authentication server via the first communication circuit. Each of at least one authentication server includes a second communication circuit that performs communication with each of the one or more vehicles, a verifying circuit that verifies the validity of the first transaction data obtained by at least one vehicle of the one or more vehicles, and a recording circuit that, upon verifying that the first transaction data is valid by the verifying circuit, records the first transaction data in a recording device. Accordingly, history of all parts replaced in the vehicle can be recorded in the recording device, so parts replaced in the vehicle can be managed in a sure manner.

Also, for example, an arrangement may be made where the recording device stores a pre-recorded second identifier that uniquely identifies each of the plurality of electronic control units. The verifying circuit verifies whether the first identifier included in the first transaction data is included in the second identifier, and the validity of the first transaction data. In a case where the verifying circuit verifies that the first identifier is included in the second identifier, and verifies that the first transaction data is valid, the recording circuit records the first transaction data in the recording device.

Also, for example, an arrangement may be made where, in a case where the verifying circuit verifies that the first identifier is not included in the second identifier, and verifies that the first transaction data is valid, the second communication circuit provides notification to inform the first identifier is not included in the second identifier.

Also, for example, each of the one or more authentication servers may further include a screen generating circuit that generates a screen for a user to confirm that the first identifier is not included in the second identifier, and transmits the generated screen via the second communication circuit. The generated screen provides the notification to inform that the first identifier is not included in the second identifier.

Also, for example, each of the one or more vehicles may further include an input circuit that receives an input of secret information when replacing the one or more electronic control units. The input circuit transmits the secret information to the transaction data generating circuit, and the transaction data generating circuit generates the first identifier including the first transaction data and authentication information generated from the secret information.

Also, for example, the secret information may include one or more of a first secret key that belongs to a manager of a vehicle among the one or more vehicles, and a second secret key of a shop that has replaced the one or more electronic control units, and the authentication information may include one or more of a first signature generated from the first secret key, and a second signature generated from the second secret key.

Also, for example, each of the one or more vehicles may further include an input circuit that accepts an input of a user that has replaced the one or more electronic control units. The transaction data generating circuit generates the first transaction data, the first transaction data including the first identifier, and first user information for identifying the input of the user. Recording device stores pre-recorded second user information where a plurality of users can each be uniquely identified. The verifying circuit verifies whether the first identifier included in the first transaction data is included in the second identifier, whether the first user information included in the first transaction data is included in the second user information, and the validity of the first transaction data. In a case where the verifying circuit verifies that the first identifier is included in the second identifier, verifies that the first user information is included in the second user information, and verifies that the first transaction data is valid, the recording circuit records the first transaction data in the recording device.

Also, for example, the transaction data generating circuit may further generates the first transaction data as blockchain transaction data, with the recording circuit recording the first transaction data as the blockchain transaction data.

A vehicle according to an aspect of the present disclosure is one vehicle in a management system including one or more vehicles and one or more authentication servers. The one vehicle includes a communication circuit that performs communication with at least one authentication server of the one or more authentication servers, a plurality of electronic control units connected to a network inside the one vehicle, a detection circuit that, when one or more electronic control units of the plurality of electronic control units have been replaced, detects the replaced one or more electronic control units among the plurality of electronic control units, and a transaction data generating circuit that generates transaction data including a unique identifier that uniquely identifies each of the replaced one or more electronic control units which the detection circuit has detected, and transmits the generated transaction data to the at least one authentication server via the communication circuit.

An information processing method according to an aspect of the present disclosure is an information processing method of one authentication server in a management system including one or more vehicles and one or more authentication servers. The method includes communicating, via a communication circuit, with each of the one or more vehicles, verifying, via a verifying circuit, validity of transaction data that is obtained from one vehicle of the one or more vehicles, includes a unique identifier uniquely identifying each of one or more electronic control units that have been replaced out of a plurality of electronic control units connected to a network in the one vehicle, and indicates that the one or more electronic control units have been replaced among the plurality of electronic control units, and recording, via a recording circuit, the transaction data in a recording device when the validity of the transaction data is verified in the verifying.

Embodiments will be described in detail below with reference to the drawings. Note that the embodiments described below are all general or specific examples of the present disclosure. Values, shapes, materials, components, arrangement and connection forms of components, steps, orders of steps, and so forth in the following embodiments are only exemplary, and do not restrict the present disclosure. Components in the following embodiments which are not included in an independent Claim indicating the highest concept are described as being optional components.

First Embodiment

First the system configuration of the present disclosure will be described.

1.1 System Configuration

Replacement of parts in a vehicle is managed in a sure manner in the management system according to the present disclosure. The management system and so forth will be described by way of embodiments, with reference to the drawings.

An example of a vehicle such as an automobile notifying an authentication server regarding replacement of a part, and the authentication server judging whether or not the replaced part is a genuine part, will be described with reference to the drawings in a first embodiment. A case where replacement of a part making up the vehicle involves replacement of an ECU will be described below, so replacement of an ECU will also be referred to as replacement of a part in the following description.

1.1.1 Overall Configuration of Management System 10

FIG. 1 is a diagram illustrating an example of the configuration of a management system 10 according to the first embodiment. The management system 10 has one or more vehicles, and one or more authentication servers. In the present embodiment, the management system 10 has vehicles 100a, 100b, and 100c, authentication servers 200a, 200b, and 200c, and an automaker server 300. The vehicles 100a and so on are connected with the authentication servers 200a and so on, the authentication servers 200a and so on are connected to each other, and the automaker server 300 is connected with the authentication servers 200a and so on, by a network N. The authentication servers 200a, 200b, and 200c are respectively connected to storage devices 201a, 201b, and 201c. The authentication servers 200a and so forth may be connected to the storage devices 201a and so forth via the network N, or may contain the storage devices 201a within. Blockchain transactions and blocks are electronically recorded in the storage device 201a.

1.1.2 Configuration of Vehicle 100a

The vehicles 100a and so on are automobiles for example, but are not restricted to this. The vehicles 100a and so on may be motorcycles, ships, or the like. That is to say, it is sufficient for the vehicles 100a and so on to be an arrangement where multiple ECUs are connected to a network within the vehicle 100a, and where ECUs are involved when replacing parts of the vehicle 100a.

Figure 2:
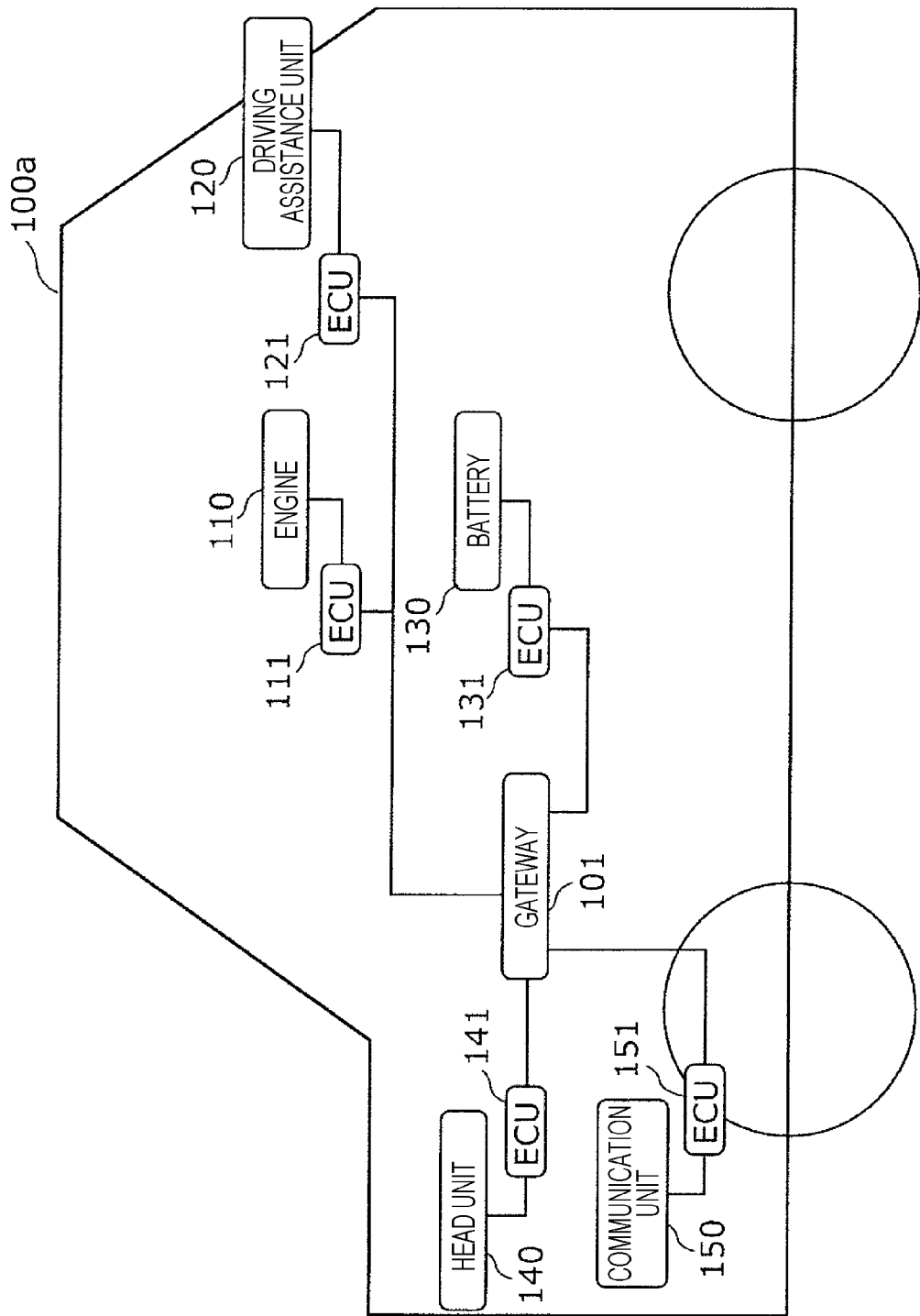
FIG. 2 is a diagram illustrating an example of the overall configuration of an onboard network system that a vehicle has in the first embodiment.

FIG. 2 is a diagram illustrating an example of the overall configuration of the onboard network system that the vehicle 100a has in the first embodiment. The vehicles 100b and 100c are also of the same configuration, so vehicle 100a will be described exemplarily.

Multiple electronic control units are connected by a network within the vehicles 100a and so on. Specifically, an ECU 111, an ECU 121, an ECU 131, an ECU 141, an ECU 151, and a gateway 101 are connected by an onboard network. The onboard network may be a CAN, an Ethernet (registered trademark), or an arrangement where CAN and Ethernet (registered trademark) coexist. Note that even in a case where the onboard network contains Ethernet (registered trademark), messages may be transmitted by broadcasting.

Drive system ECUs relating to control of fuel, such as an engine 110, a battery 130, an electric motor that is omitted from illustration, and so forth, are connected to the onboard network. In the example illustrated in FIG. 2, the ECU 111 for the engine 110 and the ECU 131 for the battery 130 are connected to the onboard network.

Also, a driving assistance unit 120, and safety-and-comfort function system ECUs, for automatic braking, lane keeping, inter-vehicular distance functions, collision avoidance functions, airbags, and so forth, which are omitted from illustration, are connected to the onboard network. The ECU 121 for the driving assistance unit 120 is connected to the onboard network in the example illustrated in FIG. 2.

An infotainment system ECU, for the head unit 140 and so forth, is connected to the onboard network. In the example illustrated in FIG. 2, the ECU 141 for the head unit 140 is connected to the onboard network. Note that an arrangement may be made where there is no ECU 141 for the head unit 140, and the head unit 140 is directly connected to the onboard network without going through the ECU 141. The head unit 140 according to the present embodiment has a later-described display unit and input unit, and has a function of displaying screens and accepting input of information from users, such as a manager of the vehicle 100a or a shop that has replaced parts for the vehicle 100a.

Figure 3:
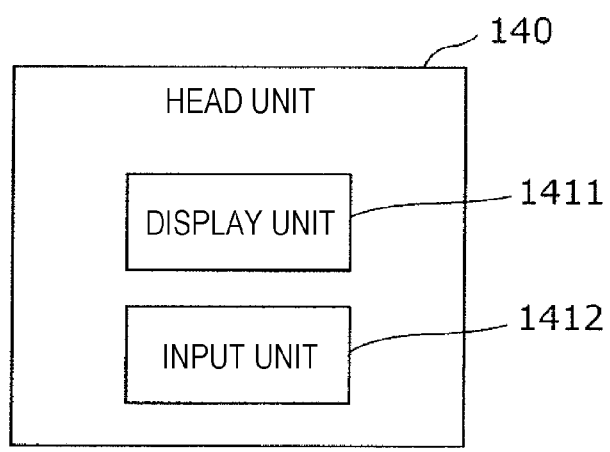
FIG. 3 is a diagram illustrating a part of the functional configuration of a head unit according to the first embodiment.

FIG. 3 is a diagram illustrating part of the functional configuration of the head unit 140 according to the first embodiment. The head unit 140 has a display unit 1411 and an input unit 1412, as illustrated in FIG. 3.

The display unit 1411 displays screens according to screen information transmitted from one of the authentication servers 200a and so on, to the user. The input unit 1412 accepts input of information from the user, and transmits this to the gateway 101. Specifically, secret information is input to the input unit 1412 when replacing one or more of the electronic control units. The secret information includes a first secret key kept by the manager of the vehicle 100a, which is one vehicle, and a second secret key kept by a shop that has replaced one or more electronic control units. The input unit 1412 transmits the input secret information to the gateway 101. Also, the results of selection made by the user in a screen displayed on the display unit 1411 are input to the input unit 1412, and the results of selection that have been input are transmitted to the gateway 101. Note that the secret information is a password input by the user, for example.

A communication system ECU for a communication unit 150 or the like that has communication functions of communicating with the authentication server 200a and so on is connected to the onboard network. In the example illustrated in FIG. 2, the ECU 151 for the communication unit 150 is connected to the onboard network.

Note that the above-described ECU 111 through ECU 151 may be configured integrally with the parts to which they connect, i.e., as a single part. For example, the engine 110 and the ECU 111 connected thereto may be configured as a single part. This holds true for the other ECUs, such as the ECU 121 and so forth.

These multiple electronic control units, i.e., ECU 111 through ECU 151 obtain the state and so forth of what they are connected to, and transmit messages of the obtained state and so forth, either periodically or irregularly. For example, the ECU 111 obtains revolutions of the engine 110 as the state and so forth, and periodically transmits messages indicating the revolutions. Also, when the driving assistance function of the driving assistance unit 120 turns on, for example, the ECU 121 transmits a message to that effect. When an ECU is newly connected to the onboard network, a message may be transmitted to that effect.

1.1.3 Configuration of Gateway 101

Figure 4:
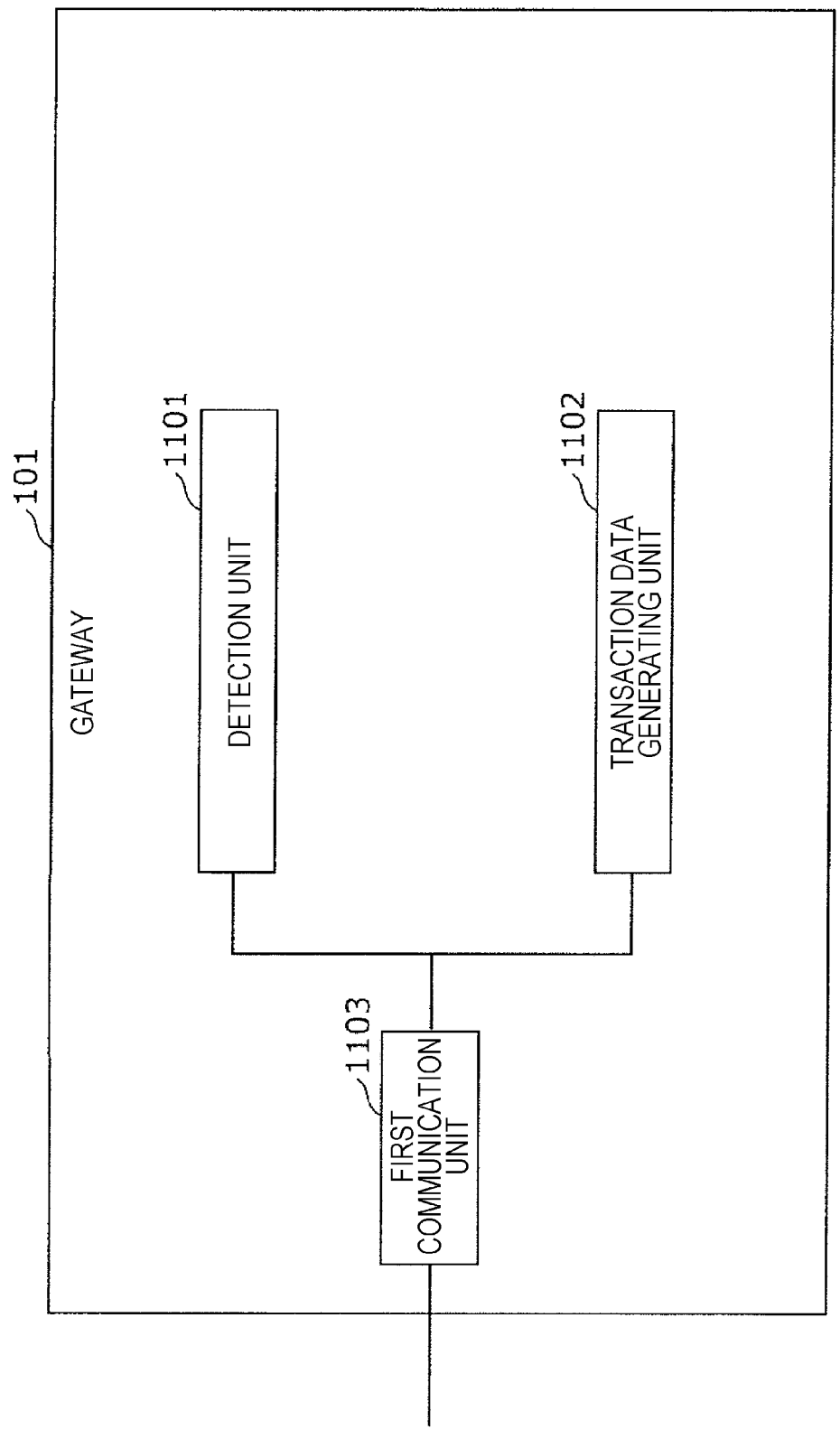
FIG. 4 is a block diagram illustrating the functional configuration of a gateway according to the first embodiment.

Next, the gateway 101 connected to the onboard network will be described. FIG. 4 is a block diagram illustrating the function configuration of the gateway 101 according to the present embodiment. The gateway 101 is installed in the vehicles 100a and so on, and has a detection unit 1101, a transaction data generating unit 1102, and a first communication unit 1103, as illustrated in FIG. 4. The components will be described below.

Detection Unit 1101

When one or more electronic control units out of the multiple electronic control units are replaced, the detection unit 1101 detects the replaced one or more electronic control units. The detection unit 1101 detects which of the ECU 111 through ECU 151 connected to the onboard network in the example illustrated in FIG. 2 has been replaced, i.e., whether or not there has been replacement of a part making up the vehicle 100a. The reason is that if a part making up the vehicle 100a is replaced, the ECU connected to or integrated with that part also is replaced, as described above.

Several methods can be listed as detection methods for detecting whether or not a part has been replaced. For example, the detection unit 1101 may detect that an ECU has been replaced with a new ECU of the same type when an ECU that is a new part is connected to the onboard network, from a message transmitted by this ECU. Also, for example, in a case where a message that had been periodically transmitted from an ECU is temporarily not obtained, the detection unit 1101 may detect that the ECU has been replaced. The detection unit 1101 may also detect that an ECU has been replaced in a case where the frequency, type, or the like of messages transmitted from an ECU has changed. In a case where the onboard network is an Ethernet (registered trademark), the detection unit 1101 may detect that an ECU has been replaced based on the MAC address or IP address of the replaced ECU.

In a case of having detected a part replacement, the detection unit 1101 transmits replacement information including a first identifier uniquely identifying the replaced one or more ECUs, to the transaction data generating unit 1102. This replacement information is information indicating that the one or more ECUs each identified by this first identifier have been replaced, and so forth. Alternatively, an arrangement may be made where the detection unit 1101 only detects a part replacement.

Transaction Data Generating Unit 1102

The transaction data generating unit 1102 generates first transaction data including the first identifier uniquely identifying each of the one or more electronic control units that the detection unit 1101 has detected, and indicating that the one or more electronic control units have been replaced. The transaction data generating unit 1102 transmits the generated first transaction data to one of the authentication server 200a and so on via the first communication unit 1103. The transaction data generating unit 1102 also generates the first transaction data as blockchain transaction data. For example, the transaction data generating unit 1102 may generate the first transaction data including the first identifier and authentication information generated from secret information. Note that the authentication information is a signature or a hash value for a password. In a case where the authentication information is a signature, an arrangement may be made where one or more of a first signature generated by a first secret key and a second signature generated by a second secret key is included.

In the present embodiment, the transaction data generating unit 1102 generates the first transaction data that is blockchain transaction data, from replacement information obtained from the detection unit 1101. Replacement information here indicates that one or more ECUs has been replaced, and includes the first identifier, for example. The transaction data generating unit 1102 may generate the first transaction data indicating that a part has been replaced, including the first identifier included in the obtained replacement information, along with the signature for the information including this first identifier.

Now, a signature key necessary for generating this signature may be stored at the gateway 101 beforehand. Alternatively, the signature key necessary for generating this signature may be generated based on secret information input at the input unit 1412 of the head unit 140. Note that this signature is an example of authentication information included in the first transaction data. The authentication information is not restricted to being a signature. In a case where a password that the user inputs is obtained, the authentication information may be a hash value of this password.

Also note that the transaction data generating unit 1102 may generate blockchain transaction data from the selection results obtained from the head unit 140, i.e., later-described second transaction data, and transmit to the authentication server 200a and so on.

First Communication Unit 1103

The first communication unit 1103 performs communication with at least one authentication server, out of the one or more authentication servers 200a and so on. More specifically, the first communication unit 1103 is a communication interface that performs communication with at least one of the authentication servers 200a and so on via the communication unit 150 connected to the onboard network system. This communication may be carried out by Transport Layer Security (TLS). In this case, the communication unit 150 or first communication unit 1103 may store an encryption key for TLS communication.

Although description has been made that the head unit 140 includes the display unit 1411 and input unit 1412, this is not restrictive, and an arrangement may be made where a mobile terminal that the user carries has the display unit 1411 and input unit 1412. In this case, this mobile terminal may communicate with the gateway 101 to realize the functions of the display unit 1411 and input unit 1412 described above. An arrangement may also be made where this mobile terminal communicates with the authentication server 200a to realize the functions of the display unit 1411 and input unit 1412.

1.1.4 Configuration of Authentication Server 200a

Figure 5:
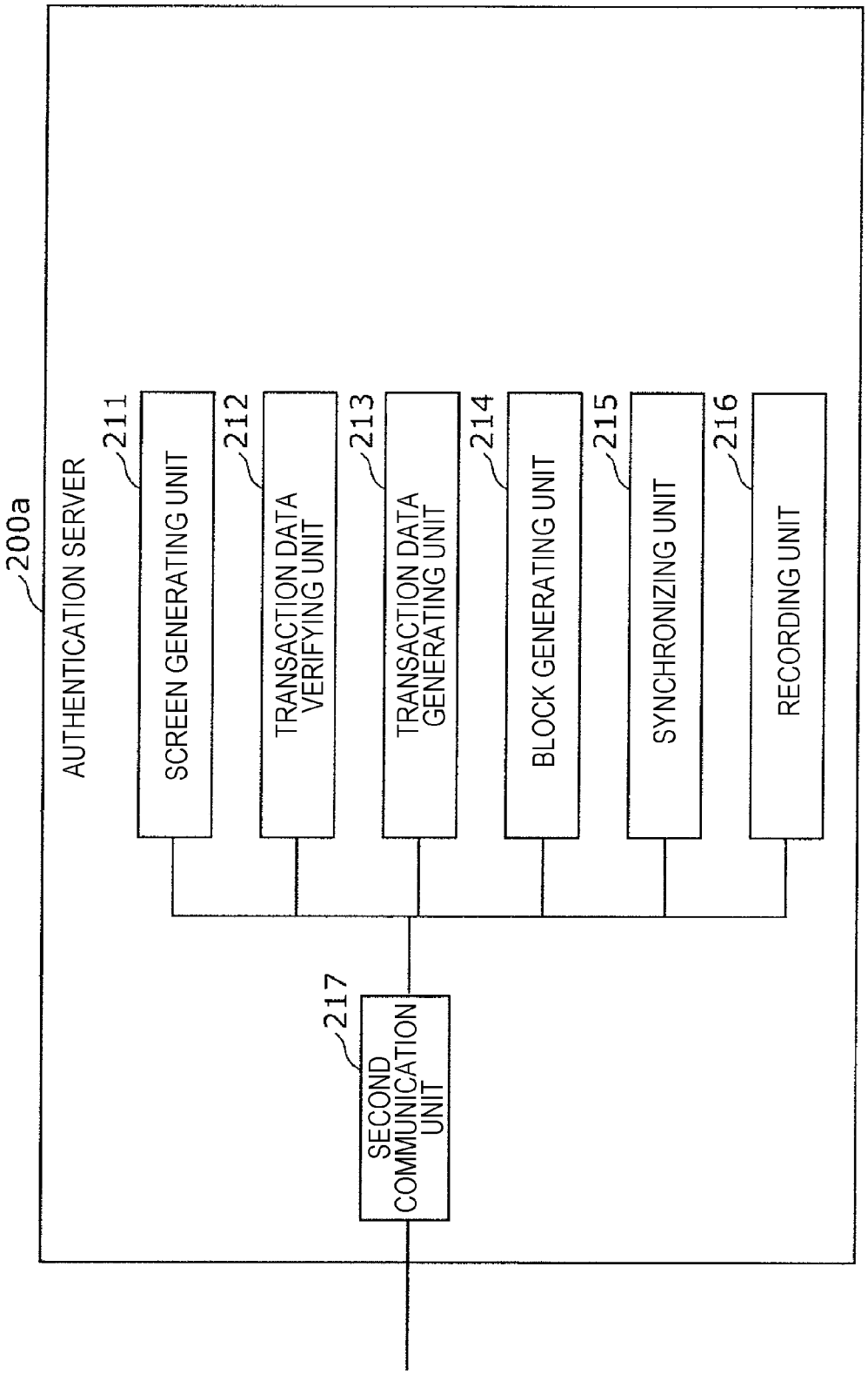
FIG. 5 is a block diagram illustrating the functional configuration of an authentication server according to the first embodiment.

Next, the authentication server 200a and so on will be described. FIG. 5 is a block diagram illustrating the function configuration of the authentication server 200a according to the first embodiment. The authentication servers 200b and 200c are also of the same configuration, so the authentication server 200a will be described exemplarily.

The authentication server 200a includes a screen generating unit 211, a transaction data verifying unit 212, a transaction data generating unit 213, a block generating unit 214, a synchronizing unit 215, a recording unit 216, and a second communication unit 217, as illustrated in FIG. 5. The authentication server 200a can be realized by a processor executing a predetermined program using memory. The components will be described below.

Screen Generating Unit 211

The screen generating unit 211 generates screens for the user to confirm that the first identifier uniquely identifying the replaced one or more ECUs is not included in a second identifier indicating that the ECU is a genuine part, recorded in the recording unit 216 beforehand. The screen generating unit 211 transmits screen information for the generated screen via the second communication unit 217, thereby notifying that the first identifier is not included in the second identifier.

In a case where the screen generating unit 211 has judged that the one or more replaced ECUs is non-genuine, from the first transaction data obtained from the vehicles 100a and so on, the screen generating unit 211 generates a screen for the user to make confirmation to that effect in the present embodiment. For example, the screen generating unit 211 generates a screen to be displayed in the display unit 1411 of the head unit 140 of the vehicle 100a, to confirm that the one or more ECUs replaced by the manager of the vehicle 100a are non-genuine parts, whether or not to accept using these non-genuine parts, and so forth.

The screen generating unit 211 then transmits screen information representing the generated screen to the gateway 101 of the vehicle 100a via the second communication unit 217.

Transaction Data Verifying Unit 212

The transaction data verifying unit 212 is an example of a verifying unit, and verifies the validity of the first transaction data obtained from at least one vehicle 100a out of one or more vehicles. More specifically, the transaction data verifying unit 212 verifies the validity of the first transaction data, with respect to whether the first identifier included in the first transaction data is included in the second identifier. The transaction data verifying unit 212 verifies the validity of the first transaction data obtained from the vehicle 100a or the like in the present embodiment.

More specifically, upon obtaining the first transaction data from the vehicles 100a and so on, the transaction data verifying unit 212 verifies whether the signature included in the first transaction data, i.e., the authentication information, is valid. The transaction data verifying unit 212 also verifies whether the first identifier included in the first transaction data is valid. In further detail, the transaction data verifying unit 212 verifies whether the first identifier included in the first transaction data is included in the second identifier indicating a genuine part, recorded in the recording unit 216 beforehand. In a case where the transaction data verifying unit 212 has confirmed the validity of the first transaction data as a result of having performed the verification, the transaction data verifying unit 212 records the first transaction data in the recording unit 216, and notifies the synchronizing unit 215 of the first transaction data.

In the same way, the transaction data verifying unit 212 also verifies the validity of second transaction data obtained from the vehicles 100a and so on. In a case of having confirmed the validity of the second transaction data as a result of having performed the verification, the transaction data verifying unit 212 can record the second transaction data in the recording unit 216, and notify the synchronizing unit 215 of the second transaction data.

The transaction data verifying unit 212 also verifies the validity of third transaction data obtained from the automaker server 300. In a case of having confirmed the validity of the third transaction data as a result of having performed the verification, the transaction data verifying unit 212 can record the third transaction data in the recording unit 216, and notify the synchronizing unit 215 of the third transaction data. The second transaction data and third transaction data will be described in detail later.

Transaction Data Generating Unit 213

The transaction data generating unit 213 generates second transaction data that is blockchain transaction data from the selection results obtained from the vehicles 100a and so on. The transaction data generating unit 213 generates the second transaction data indicating the selection results from the user, including approval information included in the obtained selection results, for example. This approval information is information indicating that the user has confirmed that the replaced part for the vehicle 100a is a non-genuine part, and has approved continuing to use this non-genuine part.

Now, the transaction data generating unit 213 may generate the second transaction data indicating the user selection results including the approval information included in the selection results, and signature, for example. Now, a signature is an example of authentication information, so in a case where a password that the user inputs is obtained, the hash value of this password may be used. Also, in a case where a password that the user inputs is obtained, the signature may be generated using a signature key generated from this password.

Note that this second transaction data is not restricted to being generated by the transaction data generating unit 213, and may be generated at the gateway 101 of the vehicles 100a and so on. In this case, the generated second transaction data may be obtained by the transaction data generating unit 213 from the vehicles 100a and so on, or may be obtained by the block generating unit 214.

Block Generating Unit 214

The block generating unit 214 executes a consensus algorithm among multiple authentication servers. A consensus algorithm called Practical Byzantine Fault Tolerance (PBFT) may be used, or another known consensus algorithm may be used. The block generating unit 214 executes a consensus algorithm between the authentication server 200a, authentication server 200b, and authentication server 200c in the present embodiment.

The block generating unit 214 first generates a block for the blockchain including one or more transaction data. In a case where a consensus has been reached by the consensus algorithm, the block generating unit 214 then records in the recording unit 216. The block generated by the block generating unit 214 is linked to the blockchain recorded in the recording unit 216, and recorded.

Now, the data structure of a blockchain, and the data structure of transaction data will be described. FIG. 6A is an explanatory diagram illustrating the data structure of a blockchain. A blockchain is blocks, which are recording increments thereof, linked onto a chain. Each block has multiple transaction data, and the hash value of the immediately-preceding block. Specifically, block B2 includes the hash value of the block B1 that precedes it. A hash value computed from the multiple transaction data included in the block B2 and the hash value of the block B1 is included in the block B3 as the hash value of the block B2. Linking blocks as a chain while including the contents of the previous block as a hash value enables tampering with the linked transaction data to be effectively prevented.

If past transaction data is changed, the hash value of the block will be a different value before and after changing. In order to make the falsified block appear to be legitimate, all subsequent blocks must be recreated, and this task is extremely difficult from a practical perspective.

Figure 6B:
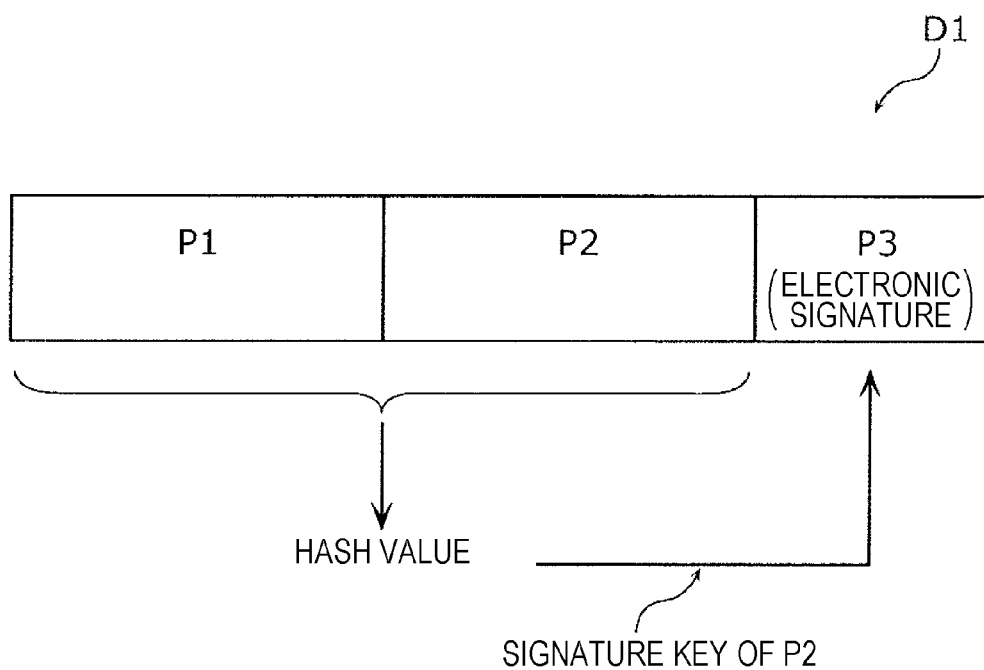
FIG. 6B is an explanatory diagram illustrating a data structure of transaction data.

The transaction data according to the present embodiment shows the first transaction data indicating that a part has been replaced, the second transaction data that indicates user selection results, and third transaction data relating to registration of genuine parts which will be described later, and so on. FIG. 6B is an explanatory diagram illustrating the data structure of transaction data. The transaction data D1 in FIG. 6B is an example of first transaction data indicating that a part has been replaced in a vehicle, for example. The transaction data D1 includes an address P1 indicating a keeper, an address P2 indicating a recipient, and an electronic signature P3 generated by applying a signature by the signature key of the keeper to the hash value of the addresses P1 and P2. Note that the address P1 will be blank for transaction data when new transaction data is being generated.

Synchronizing Unit 215

The synchronizing unit 215 performs synchronization of blocks in blockchains among multiple authentication servers, and synchronization of transaction data. Synchronization of blocks in blockchains among multiple authentication servers is performed by a peer-to-peer architecture, and recorded in the recording unit 216.

For example, in a case where the validity of the first transaction data obtained from the vehicle 100a is verified by the transaction data verifying unit 212, the synchronizing unit 215 transfers a duplicate of the first transaction data to the other authentication servers 200b and 200c. Accordingly, the verified first transaction data can be recorded in the recording units 216 of the other authentication servers 200b and 200c. Also, when first transaction data is obtained from the other authentication servers 200b and 200c, the synchronizing unit 215 records the obtained first transaction data in the recording unit 216. This is the same for the second transaction data and third transaction data as well, so description thereof will be omitted.

Recording Unit 216

The recording unit 216 records the first transaction data, second transaction data, and third transaction data as blocks of blockchains in the storage device 201a. The storage device 201a may be configured within the recording unit 216, or may be configured outside of the authentication server 200a as illustrated in FIG. 1.

Upon the validity of the first transaction data being confirmed by the transaction data verifying unit 212, the recording unit 216 records the first transaction data in the storage device 201a in the present embodiment. The recording unit 216 records the first transaction data as blockchain transaction data.

The recording unit 216 may have second identifiers uniquely identifying each of the multiple electronic control units recorded in the storage device 201a beforehand. ECUs indicated by second identifiers recorded beforehand are genuine parts that an automaker has certified and guaranteed operation, for example. In this case, in a case where the transaction data verifying unit 212 has confirmed that the first identifier is included in a second identifier, and that the validity of the first transaction data has been confirmed, the recording unit 216 may record the first transaction data in the storage device 201a. Accordingly, replacement of a part that is a genuine part will be recorded in the storage device 201a in a sure manner.

Second Communication Unit 217

The second communication unit 217 performs communication with each of the one or more vehicles 100a and so on. In a case where the transaction data verifying unit 212 has confirmed that the first identifier is not included in a second identifier, and that the validity of the first transaction data has been confirmed, the second communication unit 217 makes notification to the effect that the first transaction data is not included in a second identifier. Accordingly, the vehicles 100a and so on can be notified that a non-genuine part has been replaced.

More specifically, the second communication unit 217 is a communication interface that communicates with the vehicles 100a and so on and the automaker server 300. This communication may be performed using TLS. In this case, the encryption key for TLS communication may be stored in the second communication unit 217.

1.1.5 Configuration of Automaker Server 300

Next, the automaker server 300 will be described. FIG. 7 is a block diagram illustrating the functional configuration of the automaker server 300 according to the first embodiment. The automaker server 300 has an input unit 311, a transaction data generating unit 312, and a third communication unit 313, as illustrated in FIG. 7. The automaker server 300 can be realized by a processor executing a predetermined program using memory. The components are described below.

Input Unit 311

The input unit 311 accepts input relating to a genuine part that the automaker manages, and transmits this to the transaction data generating unit 312. More specifically, the input unit 311 accepts input of a second identifier that uniquely identifies each of multiple electronic control units, which are genuine parts managed by the automaker. The input unit 311 then transmits the input second identifier to the transaction data generating unit 312.

Transaction Data Generating Unit 312

The transaction data generating unit 312 generates third transaction data, which is blockchain transaction data, from the input information obtained by being transmitted from the input unit 311. The transaction data generating unit 312 generates the third transaction data indicating registration of a genuine part, including the second identifier. The transaction data generating unit 312 generates the third transaction data indicating registration of a genuine part, including the second identifier and the signature of the automaker server 300 in the present embodiment. Note that a signature is an example of authentication information, so in a case where a password that the automaker server 300 inputs is obtained, the hash value of this password may be used.

Third Communication Unit 313

The third communication unit 313 is a communication interface that communicates with the vehicles 100a and so on and the authentication servers 200a and so on. This communication may be performed using TLS. In this case, the encryption key for TLS communication may be stored in the third communication unit 313.

1.2 Operations, Etc.

The processing operations of the management system 10 configured as described above will be described next.

1.2.1 Registration Processing Between Automaker Server 300 and Authentication Servers 200a and so on First, registration processing of registering the second identifier that uniquely identifies genuine parts in the authentication servers 200a and so on will be described. Description will be made here regarding a case of the automaker server 300 transmitting third transaction data including the second identifier to one authentication server 200a of the authentication servers 200a and so on.

Figure 8A:
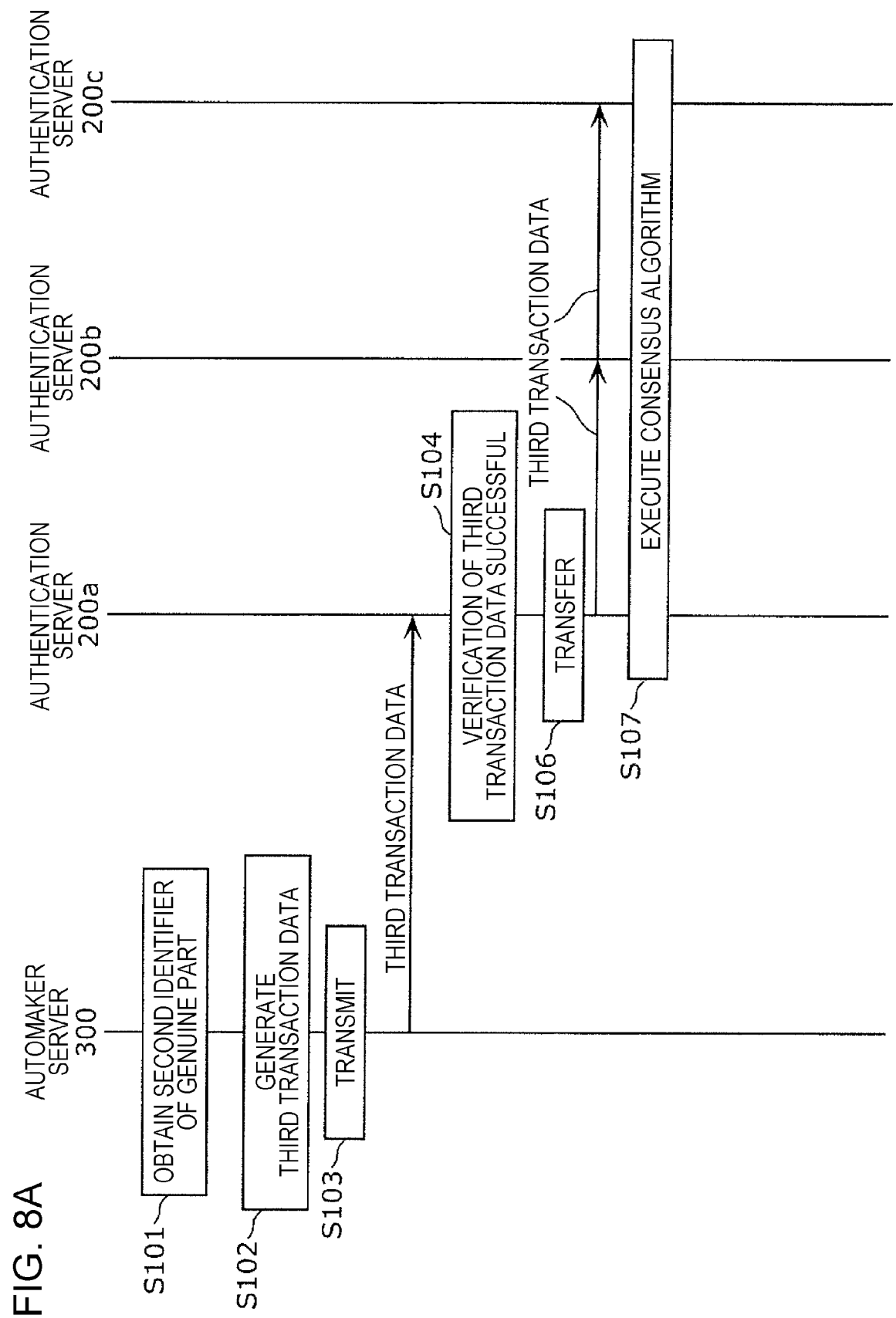
FIG. 8A is a sequence diagram illustrating registration processing between the automaker server and authentication server in the first embodiment.
Figure 8B:
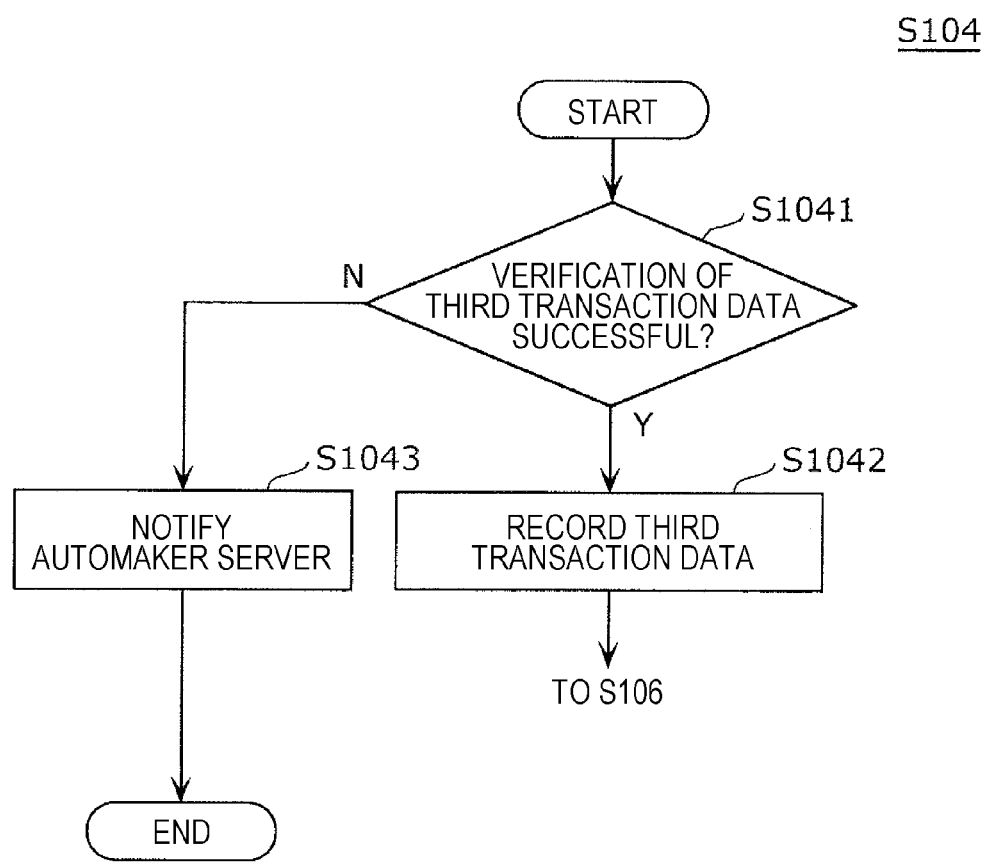
FIG. 8B is a flowchart illustrating detailed processing of step S104 in FIG. 8A.

FIG. 8A is a sequence diagram illustrating registration processing between the automaker server 300 and authentication servers 200a and so on according to the first embodiment. FIG. 8B is a flowchart illustrating detailed processing of step S104 in FIG. 8A.

First, in step S101, the automaker server 300 obtains the second identifier indicating a genuine part that can be used to replace a part making up the vehicles 100a and so on.

Next, in step S102, the automaker server 300 generates third transaction data including the second identifier of the genuine part that has been obtained. The third transaction data is generated including the second identifier, signature of the automaker server 300, and so forth, for example, in the present embodiment.

The automaker server 300 then transmits the generated third transaction data to the authentication server 200a in step S103. Although FIG. 8A illustrates an example of the automaker server 300 transmitting the generated third transaction data to the authentication server 200a, this is not restrictive. Transmission may be made to any one of the authentication servers 200a and so on.

Then in step S104, the authentication server 200a verifies the third transaction data that has been obtained, and if successful, records the third transaction data in the recording unit 216. The flow then advances to step S106.

The detailed processing in S104 will be described here with reference to FIG. 8B. The authentication server 200a first performs verification of the obtained third transaction data, and confirms if successful or not (S1041). More specifically, the authentication server 200a verifies whether the second identifier included in the third transaction data is valid, and whether the signature of the automaker server 300 included in the third transaction data is valid. That is to say, the authentication server 200a verifies whether or not the second identifier and signature are valid. In a case where the authentication server 200a has confirmed that the second identifier and signature are valid in step S1041, and verification of the third transaction data is successful (Yes in S1041), the authentication server 200a records the third transaction data in the recording unit 216 (S1042), and the flow advances to step S106. In a case where verification of the third transaction data is not successful in step S1041, the authentication server 200a notifies the automaker server 300 to that effect (S1043), and the registration processing ends.

Next, the authentication server 200a transmits duplicates of the obtained third transaction data to the other authentication servers 200b and 200c in step S106. Note that the other authentication servers 200b and 200c also verify the third transaction data transferred thereto. This verification processing is the same as the processing described with reference to FIG. 8B.

In step S107, the authentication server 200a, authentication server 200b, and authentication server 200c execute a consensus algorithm. Execution of the consensus algorithm verifies that the third transaction data obtained by the authentication server 200a, authentication server 200b, and authentication server 200c is valid. The authentication servers 200a, 200b, and 200c generate a block including the verified third transaction data. Thus, a block including the second identifier indicating a genuine part is generated, so whether a replaced ECU is a genuine part can be judged by referencing the blockchain.

1.2.2 Verification Processing Between Vehicle 100a and Authentication Servers 200a and so on Next, processing in a case where part replacement of the vehicle 100a has been detected, and the replacement part is verified among the vehicle 100a and authentication servers 200a and so on will be described. A case of transmitting first transaction data from the vehicle 100a to one authentication server 200a out of the authentication servers 200a and so on will be described here.

Figure 9A:
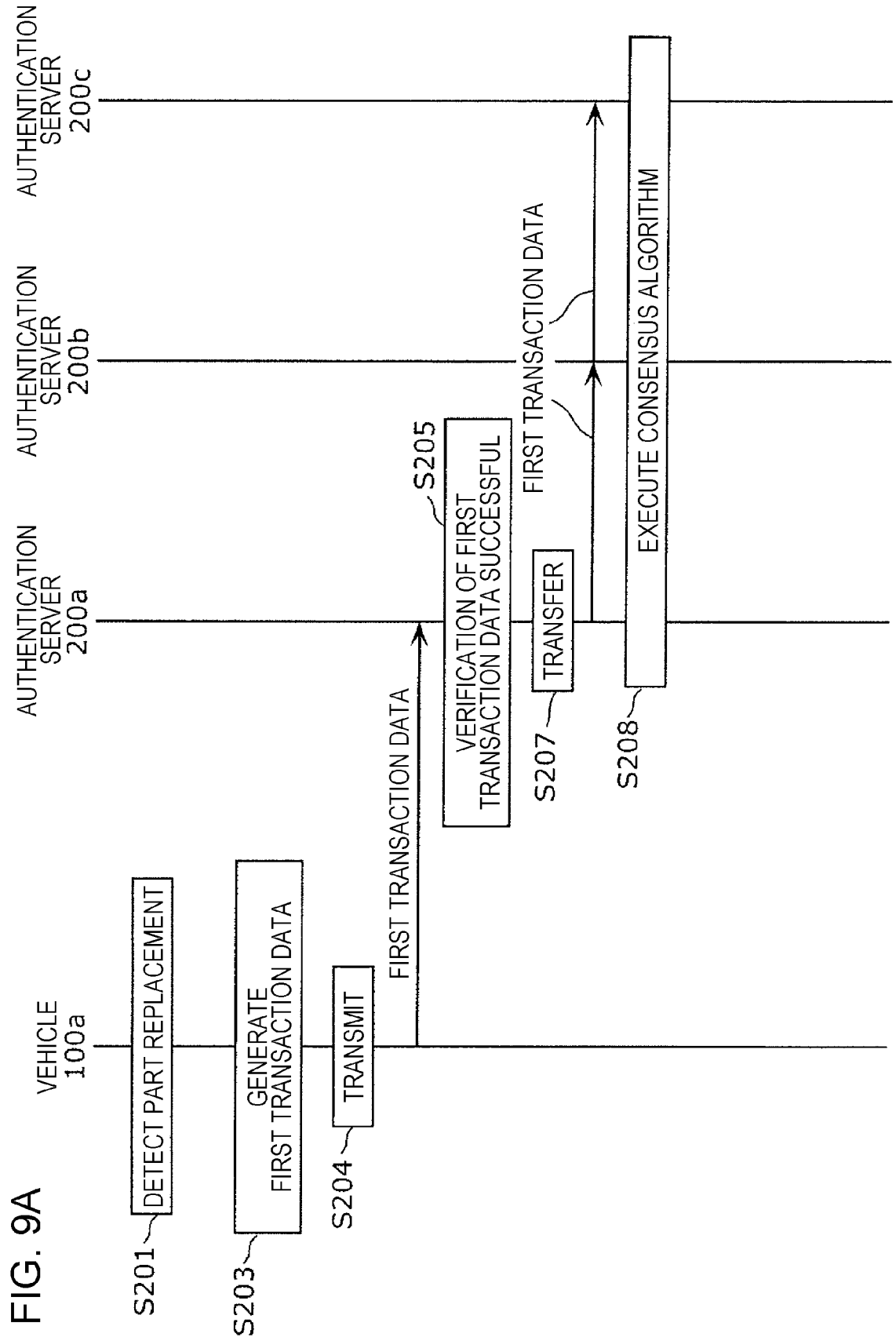
FIG. 9A is a sequence diagram illustrating first verification processing between the vehicle and authentication server in the first embodiment.
Figure 9B:
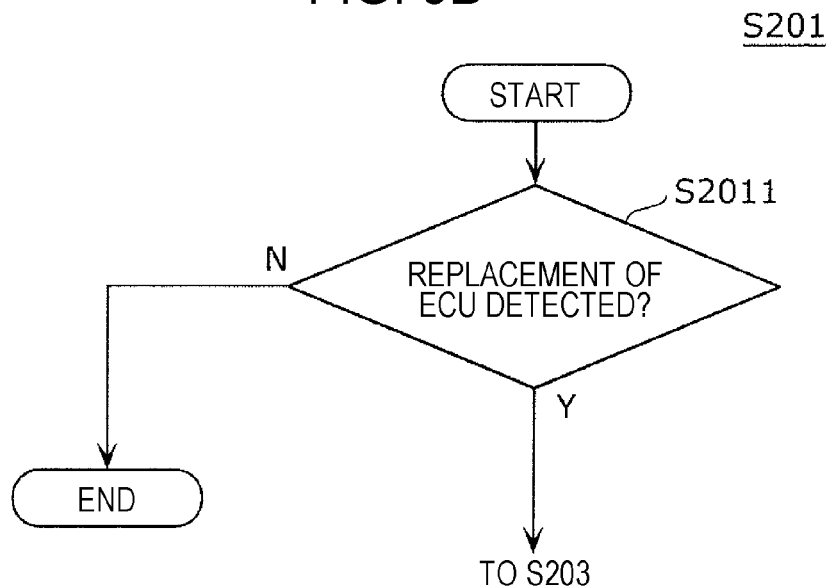
FIG. 9B is a flowchart illustrating detailed processing of step S201 in FIG. 9A.
Figure 9C:
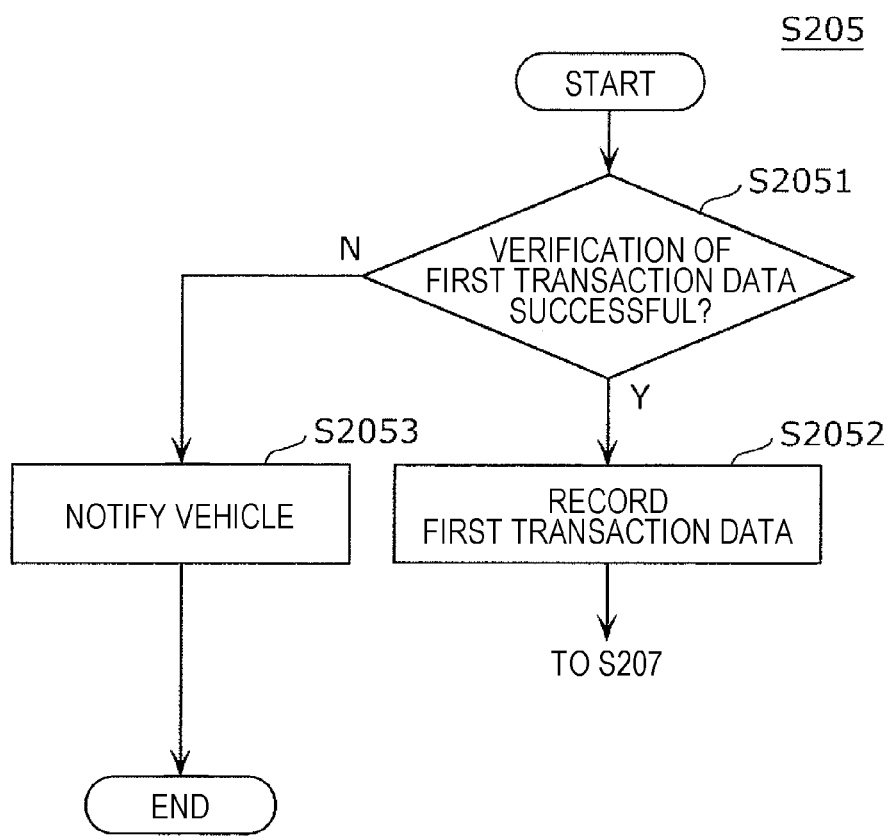
FIG. 9C is a flowchart illustrating detailed processing of step S205 in FIG. 9A.

FIG. 9A is a sequence diagram illustrating first verification processing between the vehicle 100a and the authentication servers 200a and so on in the present embodiment. FIG. 9B is a flowchart illustrating detailed processing of step S201 in FIG. 9A. FIG. 9C is a flowchart illustrating detailed processing of step S205 in FIG. 9A. The first verification processing will be described here as processing from detection of part replacement of the vehicle 100a up to verification of the first transaction data indicating part replacement.

First, in step S201, the gateway 101 of the vehicle 100a detects that a part making up the vehicle 100a has been replaced. Detailed processing of step S201 will be described with reference to FIG. 9B. The gateway 101 of the vehicle 100a first confirms whether replacement of any of the ECUs connected to the onboard network has been detected (S2011). More specifically, if a part making up the vehicle 100a is replaced, the ECU connected to or integrated with this part will also be replaced. Accordingly, the gateway 101 can detect that a part making up the vehicle 100a has been replaced, by detecting replacement of one of the ECUs connected to the onboard network. In a case where replacement of an ECU has been detected in step S2011 (Yes in S2011), the gateway 101 advances to step S203. In a case where replacement of an ECU is not detected in step S2011 (No in S2011), the gateway 101 ends the first verification processing.

The gateway 101 of the vehicle 100a then in step S203 generates the first transaction data including the first identifier indicating the replaced ECU. In the present embodiment, the first transaction data is generated including the first transaction data, and authentication information such as a signature for information including the first transaction data, for example.

Then in step S204, the gateway 101 of the vehicle 100a transmits the generated first transaction data to the authentication server 200a. Although FIG. 9A shows an example where the vehicle 100a transmits the generated first transaction data to the authentication server 200a, this is not restrictive. Transmission may be made to any authentication server of the authentication servers 200a and so on.

The authentication server 200a then performs verification of the obtained first transaction data in step S205. If successful, the first transaction data is recorded in the recording unit 216, and the flow advances to step S207.

Detailed processing of step S205 will be described here with reference to FIG. 9C. The authentication server 200a first verifies the obtained first transaction data, and confirms whether or not verification is successful (S2051). More specifically, the authentication server 200a verifies whether the first identifier included in the first transaction data and the signature included in the first transaction data are valid. That is to say, the authentication server 200a confirms whether or not the first identifier and signature are valid. In a case where the authentication server 200a confirms that the first identifier and signature are valid in step S2051, and verification of the first transaction data is successful (Yes in S2051), the first transaction data is recorded in the recording unit 216 (2052), and the flow advances to step S207. Note that in a case where verification of the first transaction data is not successful (No in S2051), the gateway 101 of the vehicle 100a is notified to that effect (S2053), and the first verification processing ends.

The authentication server 200a transmits duplicates of the obtained first transaction data to the other authentication servers 200b and 200c in step S207. Note that the other authentication servers 200b and 200c also verify the first transaction data transferred thereto. This verification processing is the same as the processing described with reference to FIG. 9C.

In step S208, the authentication server 200a, authentication server 200b, and authentication server 200c execute a consensus algorithm. Execution of the consensus algorithm verifies that the first transaction data obtained by the authentication server 200a, authentication server 200b, and authentication server 200c is valid. The authentication servers 200a, 200b, and 200c generate a block including the verified first transaction data.

Figure 10A:
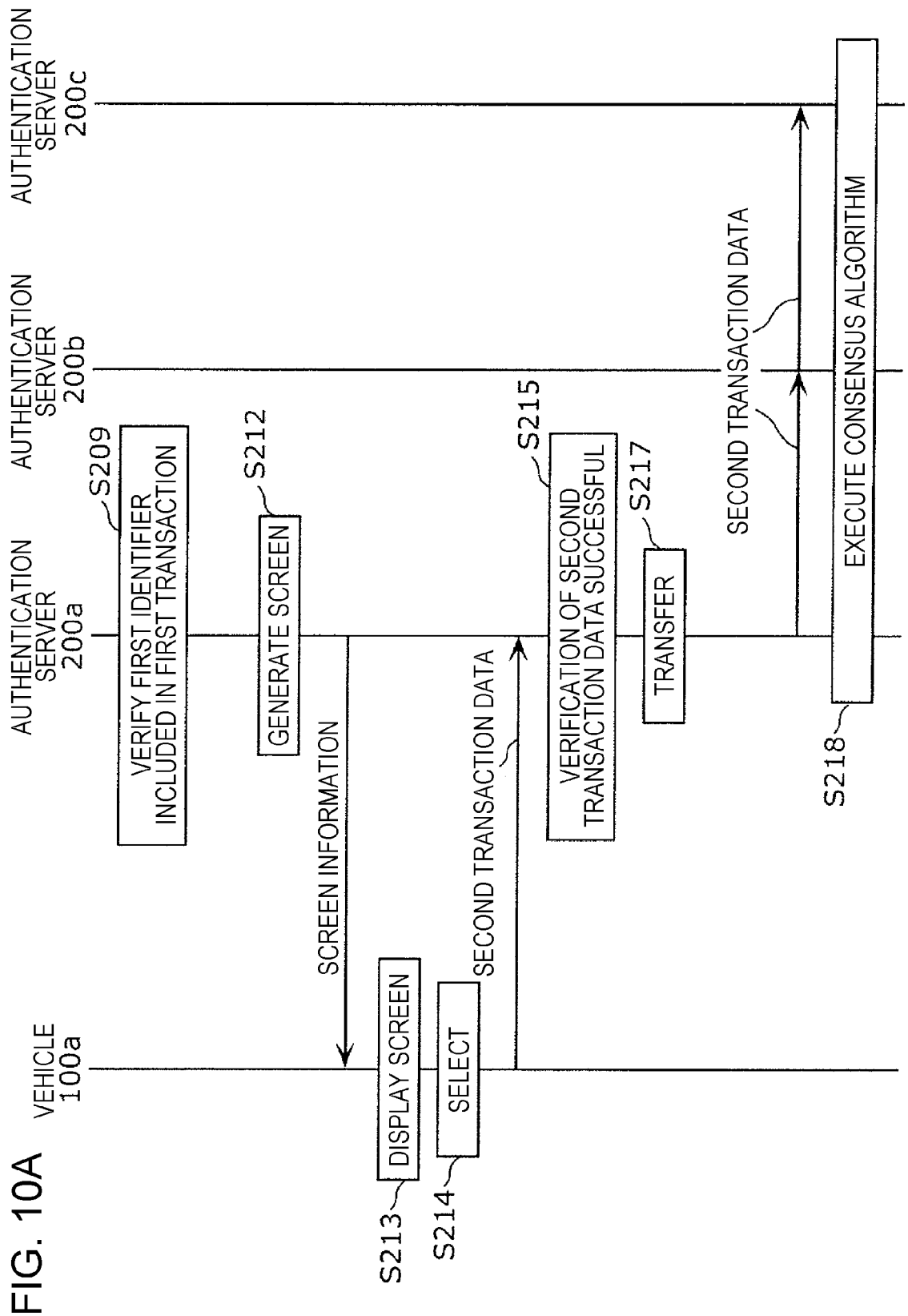
FIG. 10A is a sequence diagram illustrating second verification processing between the vehicle and authentication server in the first embodiment.
Figure 10B:
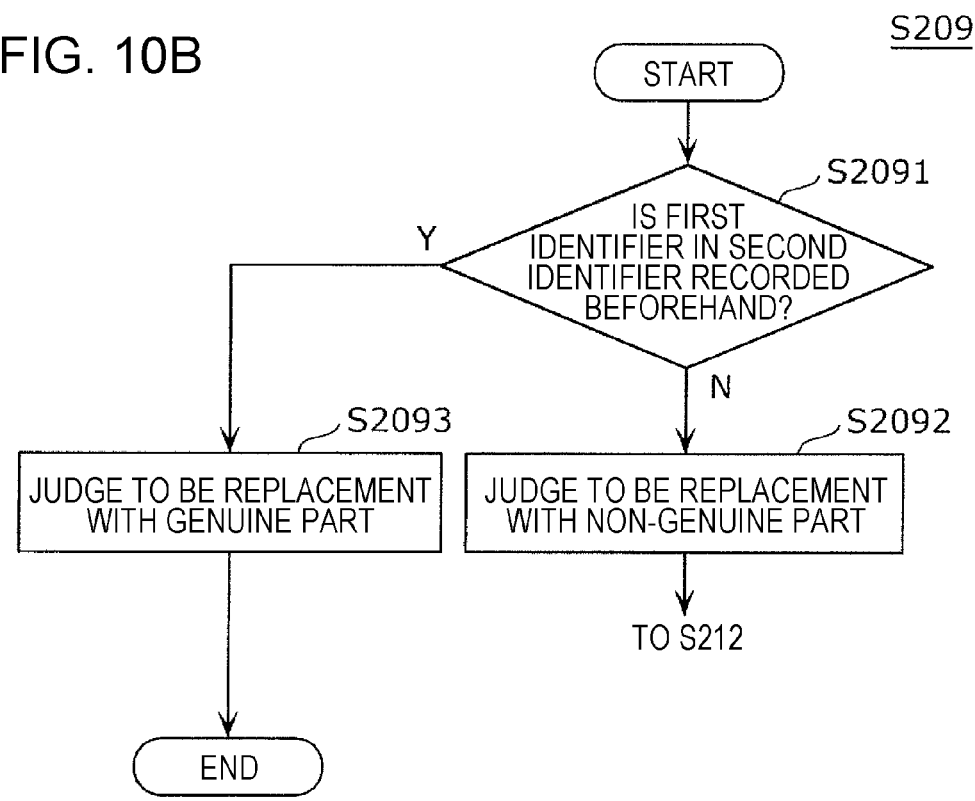
FIG. 10B is a flowchart illustrating detailed processing of step S209 in FIG. 10A.
Figure 10C:
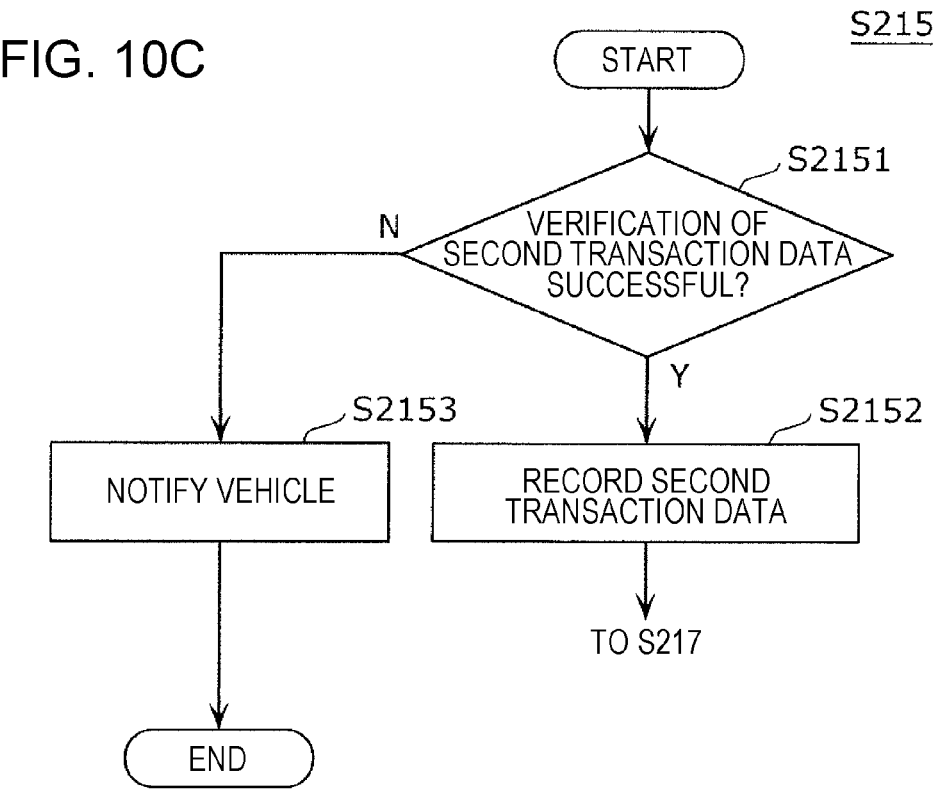
FIG. 10C is a flowchart illustrating detailed processing of step S215 in FIG. 10A.

Next, second verification processing that follows the first verification processing will be described. FIG. 10A is a sequence diagram illustrating the second verification processing between the vehicle 100a and authentication servers 200a and so on in the first embodiment. FIG. 10B is a flowchart illustrating detailed processing of step S209 in FIG. 10A. FIG. 10C is a flowchart illustrating detailed processing of step S215 in FIG. 10A. The second verification processing is performed following the first verification processing where the first transaction data indicating the part replacement is recorded. More specifically, the second verification processing is processing following the first verification processing up to verification of second transaction data indicating that the user has selected to continue to use the replaced ECU, even if the ECU indicated by the first identifier included in the first transaction data is a non-genuine part.

Next, in step S209, the authentication server 200a performs verification of the first identifier indicating the replaced ECU, which is included in the first transaction data, and in a case where the first identifier is not included in the blockchain, advances to step S212.

Now, the detailed processing in step S209 will be described with reference to FIG. 10B. First, confirmation is made regarding whether the first identifier included in the first transaction data is present in the second identifier that has been recorded beforehand (S2091). More specifically, the authentication server 200a confirms whether or not the first identifier of the first transaction data regarding which a block has already been generated is included in the second identifier indicating a genuine part recorded in the blockchain beforehand. In step S2091, in a case where the first identifier is not in the second identifier recorded beforehand (No in S2091), the authentication server 200a judges that the replacement of the ECU indicated by the first identifier has been a replacement with a non-genuine part (S2092), and the flow advances to step S212. On the other hand, in step S2091, in a case where the first identifier is in the second identifier recorded beforehand (Yes in S2091), the authentication server 200a judges that the replacement of the ECU indicated by the first identifier has been a replacement with a genuine part (S2093), and ends the second verification processing.

The authentication server 200a then generates a screen in step S212 to the effect that the replaced ECU is a non-genuine part, for the user to confirm using this non-genuine part, and transmits to the vehicle 100a.

In step S213, the vehicle 100a displays the screen obtained from the authentication server 200a. In the present embodiment, the vehicle 100a displays this screen on the head unit 140. This screen is such as that illustrated in FIG. 11, for example. FIG. 11 is a diagram illustrating an example of a display screen displayed at the vehicle 100a in the present embodiment. An example is illustrated in FIG. 11 where a screen is displayed that states "AN AUTOMOBILE PART HAS BEEN REPLACED. THIS IS NOT AN AUTO-MAKER GENUINE PART. CONTINUE USE?" That is to say, FIG. 11 illustrates an example of a display screen to the effect that the replaced ECU in the vehicle 100a is not a genuine part, for the user to confirm using this non-genuine part.

Next, user selection as to the display screen displayed at the vehicle 100a is accepted in step S214. The vehicle 100a then generates second transaction data indicating the results of selection by the user, and transmits to the authentication server 200a. User selection is to accept input of one of "YES" and "NO" shown in FIG. 11, for example.

Next, in step S215, the authentication server 200a performs verification of the obtained second transaction data, and if successful, records the second transaction data in the recording unit 216, and the flow advances to step S217.

Detailed processing of step S215 will be described now with reference to FIG. 10C. The authentication server 200a first performs verification of the obtained second transaction data, and confirms whether or not the verification was successful (S2151). In further detail, the authentication server 200a verifies whether the signature included in the second transaction data is valid. In a case where validity of the signature has been confirmed, and thus verification of the second transaction data has been successful in step S2151 (Yes in S2151), the authentication server 200a records the second transaction data in the recording unit 216 (S2152), and the flow advances to step S217. Note that in a case where verification of the second transaction data in step S2151 is unsuccessful (No in S2151), the authentication server 200a notifies the gateway 101 of the vehicle 100a to that effect (S2153), and ends the second verification processing.

Next, the authentication server 200a transmits duplicates of the obtained second transaction data to the other authentication servers 200b and 200c in step S217. Note that the other authentication servers 200b and 200c also verify the second transaction data transferred thereto. This verification processing is the same as the processing described with reference to FIG. 10C.

In step S218, the authentication server 200a, authentication server 200b, and authentication server 200c execute a consensus algorithm. Execution of the consensus algorithm verifies that the second transaction data obtained by the authentication server 200a, authentication server 200b, and authentication server 200c is valid. The authentication servers 200a, 200b, and 200c generate a block including the verified second transaction data.

1.3 Advantages of First Embodiment

Thus, according to the management system 10 and so forth of the first embodiment, the history of all parts replaced in the vehicle can be recorded in a storage device, so parts replaced in the vehicle can be managed in a sure manner. Also, according to the management system 10 and so forth of the first embodiment, whether or not a replaced part was a genuine part, and the fact that confirmation was made with the user if a non-genuine part, is also recorded as history. More specifically, verification of whether the replaced part is a genuine part is performed between the vehicle and authentication server, and if the replaced part is a non-genuine part, the user is notified to further confirm usage of the non-genuine part. Thus, the management system according to the first embodiment can manage parts replaced in a vehicle in a sure manner.

In other words, according to the management system 10 and so forth of the first embodiment, whether parts replaced in a vehicle are genuine parts that an automaker has certified and guaranteed operation when used in the vehicle, or non-genuine parts, can be managed in a sure manner. Further, in a case where a replaced part in the vehicle is a non-genuine part, the fact that the user has made confirmation is also managed in a sure manner.

Thus, in a case where there is trouble such as the vehicle malfunctioning or an accident occurring, the problem can be easily sorted into whether the problem was with the vehicle itself, or a genuine part used in the vehicle, or a non-genuine part used in the vehicle, and so on. For example, a case is conceivable where the battery of the vehicle is replaced with a battery that is a non-genuine part, and as a result, output of the battery is insufficient to where traveling of the vehicle is affected, and safe travel of the automobile is at risk. In such a case, using the management system 10 and so forth according to the first embodiment enables the part replaced in the vehicle to be found to be a non-genuine part in a sure manner, so it can be easily found that the non-genuine part used in the vehicle is the source of the problem. As a result, due to using the management system according to the first embodiment, if there is a problem with the vehicle itself or a genuine part, the automaker can work on improving the functions and so forth thereof, and if the problem is with a non-genuine part, a warning can be issued that this non-genuine part is sub-standard.

Further, the automaker can confirm whether the replaced part is a genuine part, and thus can guarantee the replaced part itself and the operations of the vehicle in which this part has been replaced. On the other hand, even if the replaced part is a non-genuine part, the user can use this part as long as agreeing to the part not being covered by automaker guarantee.

Also, the manager of the vehicle can confirm whether or not all parts replaced in the vehicle are genuine parts. Accordingly, if only genuine parts have been used as replacement parts in the vehicle, the manager of the vehicle can guarantee that only genuine parts have been used in the vehicle, and thus can maintain the value of this vehicle as a used vehicle.

Blockchain technology, where tampering is difficult, is used to manage replacement of parts and so forth of vehicles in the management system 10 and so forth according to the first embodiment, so parts replaced in vehicles can be managed in a sure manner by an even safer system.

Modification

Although description has been made in the first embodiment regarding the management system 10 where replacement of parts in vehicles is managed by blockchain technology that is difficult to tamper with, replacement of parts in vehicles does not have to be managed by blockchain technology. This point will be described as a modification, description being made primarily regarding points that differ from the first embodiment.

1.4 System Configuration

The management system 10 according to the present modification manages replacement of parts in vehicles in a sure manner, by recording whether or not a replaced part was a genuine part, and the fact that confirmation was made with the user if a non-genuine part, as history, in the same way as in the first embodiment. The management system 10 according to the present modification has one or more vehicles 100a, 100b, and 100c illustrated in FIG. 1 for example, one or more authentication servers such as the authentication server 200A illustrated in FIG. 12 or the like, and the automaker server 300. Note that the vehicles 100a and so on differ from the first embodiment only with respect to the point that first transaction data is generated as non-blockchain transaction data, and otherwise are the same. The automaker server 300 also differs from the first embodiment only with respect to the point that third transaction data is generated as non-blockchain transaction data, and otherwise is the same. The authentication server 200A will be described later.

1.4.1 Configuration of Authentication Server 200A

FIG. 12 is a block diagram illustrating the functional configuration of the authentication server 200A according to the modification of the first embodiment. Components that are the same as in FIG. 5 are denoted by the same reference numerals, and detailed description thereof will be omitted.

The authentication server 200A illustrated in FIG. 12 differs from the authentication server 200a according to the first embodiment with regard to the point that the configuration of a transaction data generating unit 213A differs, and that the block generating unit 214 has been omitted. The transaction data generating unit 213A generates second transaction data that is not blockchain transaction data from the results of selection obtained from the vehicles 100a and so on. Otherwise, the configuration is the same as in the first embodiment, so description will be omitted.

1.5 Operations, Etc.

The processing operations of the management system 10 according to the present modification configured as described above will be described next.

1.5.1 Registration Processing Between Automaker Server 300 and Authentication Server 200A First, registration processing of registering the second identifier that uniquely identifies genuine parts in the authentication server 200A will be described. Description will be made here regarding a case of the automaker server 300 transmitting third transaction data including the second identifier to the authentication server 200A.

FIG. 13 is a sequence diagram illustrating registration processing between the automaker server 300 and authentication server 200A according to the modification of the first embodiment. Elements that are the same as in FIG. 8A and so forth are denoted by the same reference symbols, and detailed description will be omitted. FIG. 14 is an example of a data structure used at the time of the authentication server 200A according to the modification of the first embodiment recording the third transaction data.

First, in step S101, the automaker server 300 obtains the second identifier indicating a genuine part that can be used in the vehicles 100a and so on.

Next, in step S102, the automaker server 300 generates third transaction data including the second identifier of the genuine part that has been obtained. The third transaction data here is transaction data that is not recorded as a blockchain.

The automaker server 300 then transmits the generated third transaction data to the authentication server 200A in step S103.

Then in step S104A, the authentication server 200A verifies the third transaction data that has been obtained, and if successful, the flow advances to step S104B. Detailed processing of step S104A is the same as that described in FIG. 8B, so description will be omitted here.

Next, in step S104B, the authentication server 200A records the third transaction data in the recording unit 216. More specifically, the authentication server 200A records in a storage device 201A that the ECU, i.e., the part indicated by the second identifier obtained in registration processing which is a transaction of registration, is a genuine part, as illustrated in FIG. 14 for example. Thus, the authentication server 200A records the third transaction data that is not blockchain transaction data in the storage device 201A.

1.5.2 Verification Processing Between Vehicle 100a and Authentication Server 200A Next, processing in a case where part replacement of the vehicle 100a has been detected, and the replacement part is verified among the vehicle 100a and authentication server 200A will be described. A case will be described here regarding a case of transmitting first transaction data including the first identifier from the vehicle 100a to the authentication server 200A.

Figure 15:
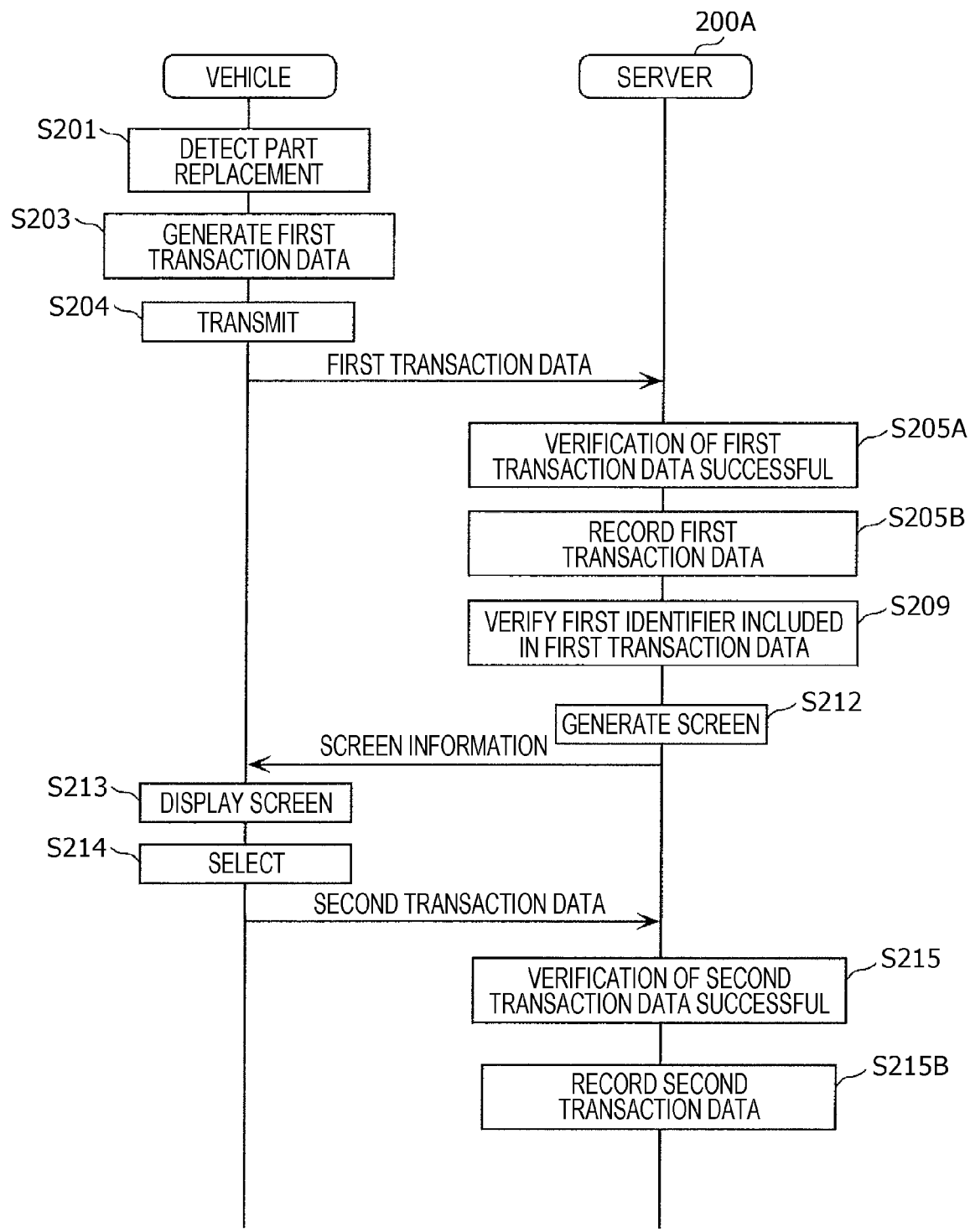
FIG. 15 is a sequence diagram illustrating first verification processing between the vehicle and authentication server in the modification of the first embodiment.

FIG. 15 is a sequence diagram illustrating first verification processing between the vehicle 100a and authentication server 200A according to the modification of the first embodiment. Elements that are the same as in FIG. 9A and so forth are denoted by the same reference symbols, and detailed description will be omitted. FIG. 16 is an example of a data structure used at the time of the authentication server 200A according to the modification of the present embodiment recording the first transaction data. The first verification processing will be described as processing from detection of part replacement of the vehicle 100a up to verification of the first transaction data indicating part replacement, here as well.

First, in step S201, the gateway 101 of the vehicle 100a detects that a part making up the vehicle 100a has been replaced. Detailed processing of step S201 is the same as that described in FIG. 9B, and accordingly description will be omitted here.

The gateway 101 of the vehicle 100a then in step S203 generates the first transaction data including the first identifier indicating the replaced ECU. In the present modification as well, the first transaction data is generated including the first identifier, and authentication information such as a signature for information including the first identifier, for example.

Next, in step S204, the gateway 101 of the vehicle 100a transmits the generated first transaction data to the authentication server 200A.

The authentication server 200A then performs verification of the obtained first transaction data in step S205A, and if successful, the flow advances to step S205B. The detailed processing of step S205B is the same as that described in FIG. 9C, so description will be omitted here.

Next, the authentication server 200A records the first transaction data in the recording unit 216 in step S205B. More specifically, the authentication server 200A records in the storage device 201A whether the ECU, i.e., the part indicated by the first identifier obtained in the transaction indicating part replacement, is a genuine part or not, an in a case of a non-genuine part, whether or not the user has confirmed this, as illustrated in FIG. 16 for example. Thus, the authentication server 200A records the first transaction data in the storage device 201A.

In the same way, the authentication server 200A also records the third transaction data in the recording device 201A using a data structure that does not use a blockchain, in the second verification processing following the first verification processing as well.

Second Embodiment

Although an arrangement has been described in the first embodiment where first transaction data is generated upon part replacement being detected at the vehicle side of the vehicles 100a and so on, this is not restrictive. An arrangement may be made where, upon detecting part replacement at the vehicle side of the vehicles 100a and so on, transmission is first made to the authentication servers 200a and so on to the effect that a part replacement has been detected, and the first transaction data is generated after having obtained information identifying the party that has replaced the part. In a second embodiment, description will be made with first transaction data containing information identifying the party that has replaced the part (hereinafter referred to as "first user information") as "fourth transaction data".

2.1 System Configuration

The management system 10 according to the second embodiment manages parts replaced in a vehicle by recording whether or not a replaced part is a genuine part, and if a non-genuine part, the fact that confirmation has been made with the user, as history, in the same way as in the first embodiment. The management system 10 according to the second embodiment also manages information identifying the party that has replaced the part.

The management system 10 according to the second embodiment has one or more vehicles 100a, 100b, and 100c and so on, one or more authentication servers such as the authentication servers 200a, 200b, 200c, and so on, illustrated in FIG. 12 or the like, and the automaker server 300, for example, in the same way as the management system 10 according to the first embodiment. Description will be made below primarily regarding points that are different from the first embodiment.

Vehicles 100a and so on

The input unit 1412 of the head unit 140 may further accept input of a first user who has replaced one or more electronic control units. Note that in a case where a mobile terminal that the user carries has the display unit 1411 and the input unit 1412 as described above, this mobile terminal can accept the input of the first user who has replaced the one or more electronic control units. In such cases, the transaction data generating unit 1102 of the gateway 101 may generate the first transaction data including the first identifier, and the first user information for identifying the first user, that has been input to the input unit 1412.
Authentication Servers 200a and so on Upon obtaining replacement information from the vehicles 100a and so on, to the effect that one or more electronic control units of the multiple electronic control units have been replaced, the screen generating unit 211 generates a screen prompting input of information indicating the first user who has replaced the one or more electronic control units. In other words, upon obtaining the replacement information, the screen generating unit 211 generates a screen for obtaining information of the first user who has replaced the parts. The screen generating unit 211 then transmits screen information indicating the generated screen to the vehicles 100a and so on, via the second communication unit 217. Other configurations are the same as described in the first embodiment, so description will be omitted.

The transaction data verifying unit 212 is an example of a verifying unit, and verifies validity of the first transaction data obtained from at least one vehicle 100a of the one or more vehicles. In the present embodiment, the transaction data verifying unit 212 verifies whether the first identifier included in the first transaction data is included in the second identifier recorded beforehand, whether the first user information included in the first transaction data is included in second user information recorded beforehand, and the validity of the first transaction data. Other configurations are the same as described in the first embodiment, so description will be omitted.

The recording unit 216 records the first transaction data, second transaction data, and third transaction data as blocks of blockchains in the storage device 201a. The recording unit 216 further records first user information whereby each of multiple users can be uniquely identified in the storage device 201a beforehand. The recording unit 216 records the first user information as blockchain transaction data.

In the present embodiment, in a case where the transaction data verifying unit 212 confirms that the first identifier is included in the second identifier, and that the first user information is included in the second user information, and that the first transaction data is valid, the recording unit 216 records the first transaction data in the storage device 201a. Other configurations are the same as described in the first embodiment, so description will be omitted. Note that in the following, description will be made with first transaction data including the first user information referred to as "fourth transaction data".

2.2 Operations, Etc.

The processing operations of the management system 10 according to the second embodiment will be described next.
2.2.1 Verification Processing Between Vehicle 100a and Authentication Servers 200a and so on Next, processing in a case where part replacement of the vehicle 100a has been detected, and the replacement part is verified among the vehicle 100a and authentication servers 200a and so on will be described. A case of transmitting fourth transaction data, which is the first transaction data including the first identifier and first user information, from the vehicle 100a to the authentication server 200a, will be described here.

Figure 17:
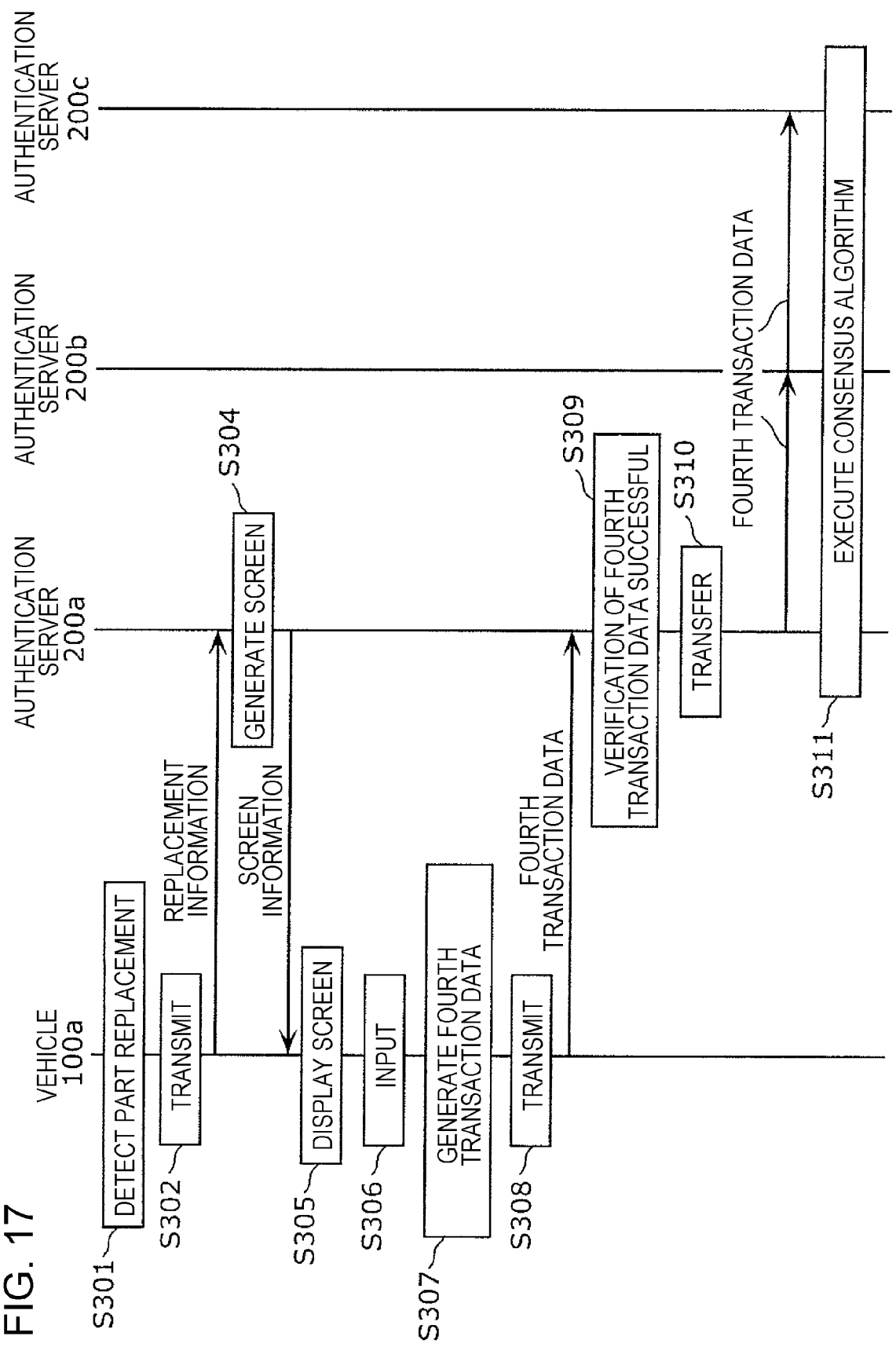
FIG. 17 is a sequence diagram illustrating first verification processing between the vehicle and authentication server in a second embodiment.

FIG. 17 is a sequence diagram illustrating first verification processing between the vehicle 100a and the authentication servers 200a according to the second embodiment. Elements the same as those in FIG. 9A and so forth are denoted by the same reference symbols, and detailed description will be omitted here. The first verification processing will be described here as processing from detection of part replacement of the vehicle 100a up to verification of the first transaction data indicating part replacement here as well.

First, in step S301, upon the gateway 101 of the vehicle 100a detecting that a part making up the vehicle 100a has been replaced, the flow advances to step S302. Detailed processing of step S301 is the same as that described in FIG. 9B, so detailed description will be omitted here.

The gateway 101 of the vehicle 100a then in step S302 notifies the authentication server 200a of replacement information to the effect that there has been a part replacement. Although FIG. 17 shows an example where the vehicle 100a transmits the replacement information to the authentication server 200a, this is not restrictive. Transmission may be made to any authentication server of the authentication servers 200a and so on.

Then in step S304, the authentication server 200a generates a screen of obtaining first user information that is information of the first user who has replaced the part, and transmits the generated screen to the vehicle 100a.

Figure 18:
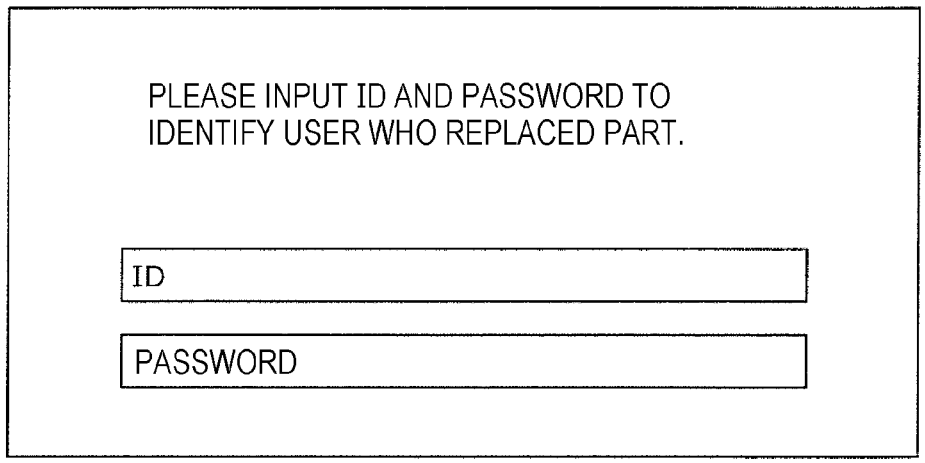
FIG. 18 is a diagram illustrating an example of a screen display displayed in the vehicle in the second embodiment.

Next, the vehicle 100a in step S305 displays the screen obtained from the authentication server 200a. Although the vehicle 100a displays this screen on the head unit 140 in the present embodiment, the display screen may be displayed on a display face of a mobile terminal that the first user carries. This screen is a screen such as illustrated in FIG. 18, for example. FIG. 18 is a diagram illustrating an example of a display screen displayed at the vehicle 100a in the second embodiment. FIG. 18 shows an example of a display screen that states "PLEASE INPUT ID AND PASSWORD TO IDENTIFY USER WHO REPLACED PART". That is to say, FIG. 18 illustrates an example of a display screen for confirming the ID and password, to identify the first user who replaced the part of the vehicle 100a.

Then in step S306, the ID and password of the first user that the first user has registered beforehand is input via the input unit 1412 that the head unit 140 or the mobile terminal that the first user carries.

In this case, the gateway 101 of the vehicle 100a generates the fourth transaction data including the first identifier indicating the replaced ECU, and a signature using a secret key generated from the ID and password of the first user, in step S307.

The gateway 101 of the vehicle 100a then in step S308 transmits the generated fourth transaction data to the authentication server 200a.

Then in step S309, the authentication server 200a performs verification of the obtained fourth transaction data, and if successful, records the fourth transaction data in the recording unit 216 and the flow advances to step S310. Note that the detailed processing of step S309 is the same as described in FIG. 9C, so description will be omitted here, but verification of the validity of the fourth transaction data is performed by verifying whether the signature, i.e., authentication information is valid, and whether the first identifier is valid.

Next, in step S310, the authentication server 200a transmits duplicates of the obtained fourth transaction data to the other authentication servers 200b and 200c in step S310. The other authentication servers 200b and 200c also verify the fourth transaction data transferred thereto. This verification processing is the same as the processing described with reference to FIG. 9C.

Then in step S311, the authentication server 200a, authentication server 200b, and authentication server 200c execute a consensus algorithm. Execution of the consensus algorithm verifies that the fourth transaction data obtained by the authentication server 200*a*, authentication server 200*b*, and authentication server 200*c* is valid. The authentication servers 200*a*, 200*b*, and 200*c* generate a block including the verified transaction data.

Thus, which first user has replaced the part can be identified from the ID included in the fourth transaction data recorded in the block chain. In other words, whether or not the first user is a second user certified by the automaker can be distinguished, so whether the replacement was performed by a shop certified by the automaker can also be managed. Note that the second verification processing following the first verification processing is the same as described in the first embodiment, so description will be omitted here.

2.3 Advantages of Second Embodiment

As described above, in the management system according to the second embodiment, whether or not a replaced part is a genuine part, and if a non-genuine part, the fact that confirmation has been made with the user, are also recorded as history. Further, the management system according to the second embodiment records which user has replaced the replaced part as history. This enables parts replaced in the vehicle to be managed in a sure manner.

Also, the management system according to the second embodiment has second users, which are certified and authorized shops, registered in the storage device beforehand. Accordingly, whether or not a first user who has replaced a part belongs to an authorized shop can be confirmed. A first user may be an individual within an authorized shop, or may be a shop that hires multiple employees. For example, the automaker can confirm not only whether replaced parts are genuine parts, but also whether a certified and authorized shop has performed the replacement, and accordingly can guarantee operations.

Modification

Although description has been made also in the second embodiment regarding a case where replacement of parts in vehicles and so forth is managed by blockchain technology that is difficult to tamper with, this is not restrictive. Not only confirmation of whether replaced parts are genuine parts, but also whether a certified and authorized shop has performed the replacement, and so forth, may also be managed without using blockchain technology, regarding replacement of parts in vehicles and so forth.

3. Other Modifications

Although the present disclosure has been described by way of the above embodiments, it is needless to say that the present disclosure is not restricted to the above embodiments. The following cases are also included in the present disclosure.

(1) Although the authentication server and automaker server have been described as being different devices in the above embodiments and modifications, the authentication server and automaker server may be configured as the same device.

(2) Although the authentication server is described as notifying the vehicle that a replaced part is not a genuine part in a case of having detected that the replaced part is a non-genuine part in the above embodiments and modifications, the automaker server may be notified as well.

(3) An arrangement is described in the first embodiment and so forth above where, in step S212 through step S214, a screen such as illustrated in FIG. 11 for example is generated in a case where a replaced part is a non-genuine part, and confirmation is made with the user to use the non-genuine part, but this is not restricted. For example, an arrangement may be made where a screen such as illustrated in FIG. 19 is further displayed in a case where the user has selected to accept using a non-genuine part in the screen displayed in step S213, such as illustrated in FIG. 11 for example, so as to accept input of the password of this user.

Figure 19:
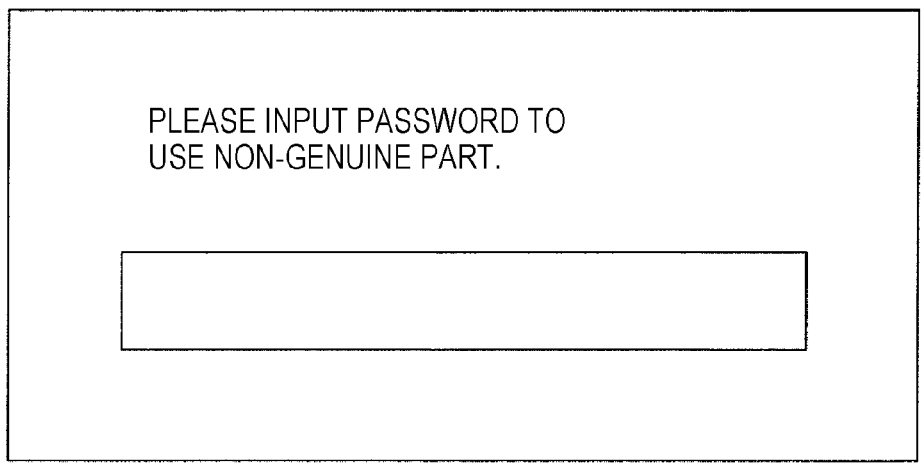
FIG. 19 is a diagram illustrating an example of a screen for entering a user password according to another modification.

FIG. 19 is a diagram illustrating an example of a screen for the user to input a password in another embodiment. That is to say, upon receiving input of a password by the user, the authentication server 200*a* may generate second transaction data indicating the results of user selecting using the input password. The user here may be the manager of the vehicle 100*a*, or be a shop that has replaced the part of the vehicle 100*a*. Alternatively, the user may be both. That is to say, an arrangement may be made where both the manager of the vehicle 100*a* and the shop that has replaced the part of the vehicle 100*a* input passwords.

A signature to be included in the second transaction data may be generated using a secret key generated from the input password. In a case where the user is both as described above, for example, the second transaction data may be generated including two signatures, which are a signature using a secret key generated from the password of the manager of the vehicle, and a signature using a secret key generated from the password of the shop that has replaced the part. The authentication server 200*a* may also generate the second transaction data including a signature using a secret key generated from each of multiple passwords that have been input.

(4) The blockchain that the authentication server manages in the first and second embodiments may be capable of being referenced from the automaker server 300. This blockchain may be capable of being referenced from not only the automaker, but also from part manufactures supplying genuine parts.

(5) Although the gateway 101 of the vehicles 100*a* and so on is described in the above embodiments and modifications as detecting replacement of a part and generating and transmitting first transaction data including a first identifier indicating the replaced part, this is not restrictive. The gateway 101 may generate the first transaction data including an identifier indicating the part before replacement. Accordingly, even if the replaced part is a non-genuine part, which part has been replaced can be easily comprehended, and the non-genuine part can be easily identified.

(6) Although the gateway 101 of the vehicles 100*a* and so on is described in the above embodiments and modifications as detecting replacement of a part and transmitting first transaction data including a first identifier indicating the replaced part, this is not restrictive. The gateway 101 may generate the first transaction data including a message transmitted by the part after replacement. Accordingly, even if the replaced part is a non-genuine part, what sort of functions the non-genuine part has can be easily comprehended, and the non-genuine part can be easily identified.

(7) Although the gateway 101 of the vehicles 100*a* and so on has been described as detecting part replacements in the above embodiments and modifications, this is not restrictive. An arrangement may be made where any or all ECUs in the onboard network of the vehicles 100*a* and so on have the same functions, and any ECU can detect replacement of parts.

(8) Although description has been made in the above second embodiment and modification thereof that the screen display illustrated in FIG. 18 is performed in step S305 to identify the first user that has replaced the part of the vehicle 100*a*, and prompts input of the user ID and password, this is not restrictive. Steps S302 through S306 may be omitted. In this case, fourth transaction data may be generated by automatically obtaining GPS information of the vehicle when detecting replacement of a part. The location indicated in the GPS information of the vehicle when detecting replacement of a part can be assumed to be the location where the replacement took place, so the location of the shop that has replaced the part can be identified, and confirmation can be made whether a shop certified by the automaker.

(9) Although description has been made in the above second embodiment and modification thereof that the user is prompted to input an ID and password in step S305, to identify the first user that has replaced the part of the vehicle 100*a*, this is not restrictive. An arrangement may be made regarding step S305, in which the user is just asked to confirm the fact of whether or not a part has been replaced, as illustrated in FIG. 20.

Figure 20:
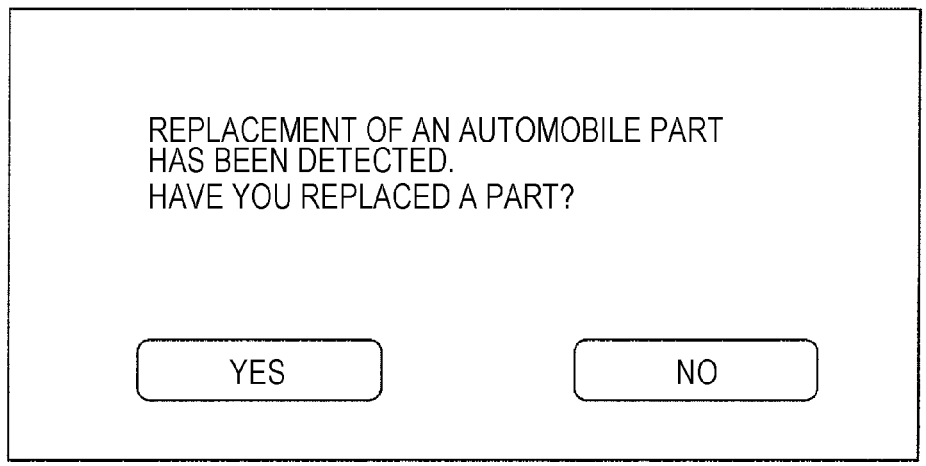
FIG. 20 is a diagram illustrating an example of a screen for confirming whether or not the user has replaced a part according to another modification.

Now, FIG. 20 is a diagram illustrating an example of a screen according to another modification, to confirm with the user the fact of whether or not a part has been replaced. That is to say, confirmation may be made with the user in step S305 regarding whether or not a part has been replaced as illustrated in FIG. 20, and the second transaction data indicating the results of confirmation may be generated. In this case, the authentication server 200*a* only records the fact that a part making up the vehicles 100*a* and so on has been replaced. Accordingly, the automaker can confirm that a part has been replaced, by referencing the record of just the fact that a part managed by the authentication server 200*a* has been replaced.

(10) Devices in the above-described embodiments and modifications specifically are computer systems made up of microprocessors, read-only memory (ROM), random access memory (RAM), hard disk units, display units, keyboards, mice, and so forth. Computer programs are recorded in the RAM or hard disk units. The devices achieve their functions by the microprocessors operating following the computer programs. Note that a computer program is configured by combining multiple sets of command codes instructing commands with respect to a computer, to achieve predetermined functions.

(11) Part or all of the components configuring the devices in the above-described embodiments and modifications may be configured as a single system large scale integration (LSI). A system LSI is a super-multi-functional LSI manufactured integrating multiple components on a single chip, and specifically is a computer system configured including a microprocessor, ROM, RAM, and so forth. A computer program is recorded in the RAM. The system LSI realizes its functions by the microprocessor operating according to the computer program. The parts of the components making up the above devices may be individually formed into one chip, or part or all may be included in one chip.

While description has been made regarding a system LSI, there are different names such as IC, LSI, super LSI, and ultra LSI, depending on the degree of integration. The circuit integration technique is not restricted to LSIs, and dedicated circuits or general-purpose processors may be used to realize the same. A field programmable gate array (FPGA) which can be programmed after manufacturing the LSI, or a reconfigurable processor where circuit cell connections and settings within the LSI can be reconfigured, may be used.

Further, in the event of the advent of an integrated circuit technology which would replace LSIs by advance of semiconductor technology or a separate technology derived therefrom, such a technology may be used for integration of the functional blocks, as a matter of course. Application of biotechnology and so forth is a possibility.

(12) Part or all of the components of which the above-described devices are configured may be configured as an IC card detachably mountable to each device or a standalone module. The IC card or module is a computer system configured including a microprocessor, ROM, RAM, and so forth. The IC card or module may include the above-described super-multifunctional LSI. The IC card or module achieves its functions by the microprocessor operating according to the computer program. The IC card or module may be tamper-resistant.

(13) The present disclosure may be the methods described above, or may be a computer program which realizes these methods by a computer, or may be digital signals made up of the computer program. The present disclosure may also be the computer program or the digital signals recorded in a computer-readable recording medium, such as for example, a flexible disk, a hard disk, a CD-ROM, MO, DVD, DVD-ROM, DVD-RAM, BD (Blu-ray (registered trademark) Disc), semiconductor memory, or the like. The present disclosure may also be the digital signals recorded in these recording mediums.

The present disclosure may also be an arrangement where the computer program or the digital signals are transmitted over an electric communication line, wireless or cable communication line, a network of which the Internet is representative, data broadcasting, or the like.

The present disclosure may also be a computer system having a microprocessor and memory, where the memory records the computer program, and the microprocessor operates according to the computer program.

The program or the digital signals may be recorded in the recording medium and transported, or the program or the digital signals may be transported over the network or the like, and thereby be executed by another computer system that is independent.

(14) The above embodiments and modifications may each be combined.

The present disclosure is applicable to a management system, a vehicle, and an information processing method of the management system, and particularly can be used in a management system, a vehicle, and an information processing method of the management system where replacement of parts in a vehicle such as an automobile is managed in a sure manner.

What is claimed is:

1. A management system, comprising:
one or more vehicles; and
one or more authentication servers,
wherein each of the one or more vehicles includes
a first communication circuit that performs communication with at least one authentication server of the one or more authentication servers,
a plurality of electronic control units (ECUs) connected to a network inside a vehicle,
a detection circuit that, when one or more electronic control units of the plurality of electronic control units have been replaced, detects the replaced one or more electronic control units among the plurality of electronic control units, and
a transaction data generating circuit that
automatically generates for transmission, in response to a detection of the replaced one or more electronic control units, first transaction data including a first identifier that uniquely identifies each of the replaced one or more electronic control units which the detection circuit has detected, and transmits the generated first transaction data to the at least one authentication server via the first communication circuit, wherein each of the at least one authentication server includes a second communication circuit that performs communication with each of the one or more vehicles, a verifying circuit that verifies validity of the first transaction data obtained by at least one vehicle of the one or more vehicles, and a recording circuit that, upon verifying that the first transaction data is valid by the verifying circuit, records the first transaction data in a recording device, wherein each of the one or more vehicles further includes an input circuit that receives an input of secret information when replacing the one or more electronic control units, wherein the input circuit transmits the secret information to the transaction data generating circuit, and wherein the transaction data generating circuit generates the first transaction data including the first identifier and authentication information generated from the secret information.

2. The management system according to claim 1, wherein the recording device stores pre-recorded second identifiers, each of which uniquely identifies each of the plurality of electronic control units, wherein the verifying circuit verifies whether the first identifier included in a list of the second identifiers, and the validity of the first transaction data, and wherein, when the verifying circuit verifies that the first identifier is included in the list of the second identifiers, and verifies that the first transaction data is valid, the recording circuit records the first transaction data in the recording device.

3. The management system according to claim 2, wherein, when the verifying circuit verifies that the first identifier is not included in the list of the second identifiers, and verifies that the first transaction data is valid, the second communication circuit provides notification to inform that the first identifier is not included in the list of the second identifiers.

4. The management system according to claim 3, wherein each of the one or more authentication servers further includes a screen generating circuit that generates a screen for a user to confirm that the first identifier is not included in the list of the second identifiers, and transmits the generated screen via the second communication circuit, and wherein the generated screen provides the notification to inform that the first identifier is not included in the list of the second identifiers.

5. The management system according to claim 2, wherein the input circuit accepts an input of a user that has replaced the one or more electronic control units, wherein the first transaction data further includes first user information for identifying the input of the user, wherein the recording device stores pre-recorded second user information where a plurality of users can each be uniquely identified, wherein the verifying circuit verifies whether the first identifier included in the first transaction data is included in the list of the second identifiers, whether user information included in the first transaction data is included in a list of second user information, and the validity of the first transaction data, and wherein, when the verifying circuit verifies that the first identifier is included in the list of the second identifiers, verifies that the user information is included in the list of the second user information, and verifies that the first transaction data is valid, the recording circuit records the first transaction data in the recording device.

6. The management system according to claim 1, wherein the secret information includes one or more of a first secret key that belongs to a manager of a vehicle among the one or more vehicles, and a second secret key of a shop that has replaced the one or more electronic control units, and wherein the authentication information includes one or more of a first signature generated from the first secret key, and a second signature generated from the second secret key.

7. The management system according to claim 1, wherein the transaction data generating circuit further generates the first transaction data as blockchain transaction data, and wherein the recording circuit records the first transaction data as the blockchain transaction data.

8. The system according to claim 1, wherein the transaction data generating circuit generate the first transaction data including the first identifier included in obtained replacement information.

9. The system according to claim 1, wherein the verifying circuit verifies validity of the first transaction data based on the authentication information included in the first transaction data.

10. One vehicle in a management system including one or more vehicles and one or more authentication servers, the one vehicle comprising:

a communication circuit that performs communication with at least one authentication server of the one or more authentication servers;

a plurality of electronic control units (ECUs) connected to a network inside the one vehicle;

a detection circuit that, when one or more electronic control units of the plurality of electronic control units have been replaced, detects the replaced one or more electronic control units among the plurality of electronic control units;

a transaction data generating circuit that automatically generates for transmission, in response to a detection of the replaced one or more electronic control units, transaction data including a unique identifier that uniquely identifies each of the replaced one or more electronic control units which the detection circuit has detected, and transmits the generated transaction data to the at least one authentication server via the communication circuit; and an input circuit that receives an input of secret information when replacing the one or more electronic control units, wherein the input circuit transmits the secret information to the transaction data generating circuit, and wherein the transaction data generating circuit generates the transaction data including the unique identifier and authentication information generated from the secret information.

11. An information processing method of one authentication server in a management system including one or more vehicles and one or more authentication servers, the method comprising:

communicating, via a communication circuit, with each of the one or more vehicles;

receiving, via an input circuit of one vehicle of the one or more vehicles, an input of secret information;

transmitting, by the input circuit to a transaction generating circuit of the one vehicle, the secret information;

verifying, via a verifying circuit, validity of transaction data that is obtained from the one vehicle, includes authentication information, and a unique identifier uniquely identifying each of one or more electronic control units that have been replaced out of a plurality of electronic control units connected to a network in the one vehicle, and indicates that the one or more electronic control units have been replaced among the plurality of electronic control units; and recording, via a recording circuit, the transaction data in a recording device when the validity of the transaction data is verified in the verifying, wherein the validity of the transaction data is verified based on the authentication information included in the transaction data, wherein the input of the secret information is received when replacing the one or more electronic control units, and wherein the transaction data including the unique identifier and the authentication information is generated from the secret information.

* * * * *